(12) United States Patent  
Bifulco

(10) Patent No.: US 12,514,256 B1  
(45) Date of Patent: Jan. 6, 2026

(54) MULTI-DIRECTIONAL CUT TENDERIZING ASSEMBLY

(71) Applicant: Phil Bifulco, Parkland, FL (US)

(72) Inventor: Phil Bifulco, Parkland, FL (US)

( * ) Notice: Subject to any disclaimer, the term of this patent is extended or adjusted under 35 U.S.C. 154(b) by 130 days.

(21) Appl. No.: 18/624,624

(22) Filed: Apr. 2, 2024

(51) Int. Cl.
*A22C 9/00* (2006.01)

(52) U.S. Cl.
CPC .................. *A22C 9/008* (2013.01)

(58) Field of Classification Search
CPC ................. A22C 9/00; A22C 9/008
USPC ................................................. 452/141–145
See application file for complete search history.

(56) References Cited

U.S. PATENT DOCUMENTS

| | | |
|---|---|---|
| 1,849,407 A | 3/1932 | McKee |
| 1,941,118 A | 12/1933 | Thompson et al. |
| 1,942,500 A | 1/1934 | Spang |
| 2,040,148 A | 5/1936 | McKee |
| 2,051,207 A | 8/1936 | Ferry |
| 2,118,119 A | 5/1938 | Spang |
| 2,149,407 A | 3/1939 | Spang |
| 2,380,371 A | 7/1945 | Spang |
| 2,492,997 A | 1/1950 | Herceg |
| 2,653,430 A | 9/1953 | Vogt |
| 2,718,028 A | 9/1955 | Read et al. |
| 2,984,138 A | 5/1961 | Vitense et al. |
| 3,222,712 A | 12/1965 | Deckert |
| 3,222,713 A | 12/1965 | Stein et al. |
| 3,273,300 A | 9/1966 | Watrous et al. |
| 3,556,185 A | 1/1971 | Lykkeberg |
| 3,716,893 A | 2/1973 | Vogelsang |
| 3,786,536 A | 1/1974 | Deckert |
| 3,962,751 A * | 6/1976 | Wagner .................. A22C 9/004 452/142 |
| 4,034,668 A | 7/1977 | Picknick et al. |
| 4,038,893 A | 8/1977 | Reist |
| 4,085,482 A * | 4/1978 | Charron .................. A22C 9/004 452/144 |
| 4,358,920 A | 11/1982 | Kanai et al. |
| 4,670,943 A | 6/1987 | Townsend |
| 4,993,211 A | 2/1991 | Piano |
| 5,222,422 A | 6/1993 | Benner, Jr. et al. |
| 5,353,233 A * | 10/1994 | Oian ....................... G01R 23/16 702/76 |
| 5,957,767 A | 9/1999 | Horton |
| 6,257,132 B1 * | 7/2001 | Bifulco .................. A22C 9/004 100/168 |
| 6,601,499 B1 * | 8/2003 | Bifulco .............. A22C 17/0013 100/168 |
| 6,722,494 B2 | 4/2004 | Nakakado |
| 6,758,109 B2 | 7/2004 | Nakakado |
| 7,036,413 B2 | 5/2006 | Hartmann et al. |

(Continued)

*Primary Examiner* — Richard T Price, Jr.

(74) *Attorney, Agent, or Firm* — Malloy & Malloy, P.L.; Peter A. Matos

(57) ABSTRACT

An assembly structured to tenderize food during a single pass along a path of travel including one or more processing sections each including two rotatable cutting rollers. Each cutting roller comprises a plurality of blades rotatable therewith and having a cutting edge disposed to penetrate the food cutting during rotation of the cutting rollers, wherein the plurality of cutting blades and corresponding ones of the cutting edges are cooperatively oriented to perform at least a bi-directional cut on the food product during the single pass thereof along the path of travel.

32 Claims, 23 Drawing Sheets

(56) References Cited

U.S. PATENT DOCUMENTS

| | | |
|---|---|---|
| 7,587,966 B2 | 9/2009 | Nakakado et al. |
| 7,682,227 B1 | 3/2010 | Bifulco |
| 7,975,584 B2 | 7/2011 | McCabe |
| 8,307,762 B1 | 11/2012 | Bifulco |
| 8,353,233 B1 | 1/2013 | Bifulco |
| 8,776,653 B1 | 7/2014 | Bifulco |
| 2002/0125105 A1 | 9/2002 | Nakakado |
| 2005/0034581 A1 | 2/2005 | Bortone et al. |
| 2006/0205335 A1* | 9/2006 | Bifulco .................. A22C 9/004 452/142 |
| 2009/0114071 A1 | 5/2009 | Mardian |
| 2010/0192739 A1 | 8/2010 | Piantoni et al. |
| 2011/0009041 A1* | 1/2011 | Spisich .................. A22C 9/008 452/141 |
| 2013/0034640 A1 | 2/2013 | Medley et al. |

\* cited by examiner

MULTI-DIRECTIONAL CUT TENDERIZING ASSEMBLY

BACKGROUND OF THE INVENTION

Field of the Invention

This invention is directed to an assembly structured to tenderize meat or other food products by performing a plurality of penetrating, multi-directional cuts thereon, during a single pass of the food product along a predetermined path of travel.

DESCRIPTION OF THE RELATED ART

For many years, the food industry has relied on manual cutting for the cutting and other processing of meat products, wherein a larger piece of meat was reduced to smaller pieces of various sizes and configurations dependent, at least in part, on the intended use of such reduced meat portions. However, it is well recognized that such manual cutting and other processing is time consuming, labor intensive and lacks consistency in the size, shape, etc. of the final product.

Such inconsistencies are particularly common to smaller pieces or chunks of meat products when cut from a larger meat portion, wherein the smaller, typically cube-like pieces are used for different applications. Despite the recognized skill and experience of butchers and like processing personnel, there is still an overall lack of consistency in terms of size, weight, and other characteristics of the smaller meat portions. In addition to the disadvantages and problems, as generally set forth above, butchers and other personnel utilizing manual cutting techniques necessarily handle the food product extensively. These procedures frequently result in sanitation problems and at least some dangers to the processing personnel.

In order to overcome problems of the type set forth above, attempts have been made to create automated meat cutting and/or processing systems which are structured to perform cutting as well as a variety of other processing features. While some of these automatic machines and/or systems are considered to be at least minimally operative for their intended purpose, consistency problems still exist in terms of the size, weight, shape, cut characteristics, etc. Included in the aforementioned problems associated with known automated machines is the difficulty of cutting through heavy gristle and/or like muscle membrane. This difficulty frequently results in the processed pieces or portions still remaining attached by virtue of the failure to cut completely through existing gristle, etc. While many of the disadvantages associated with manual processing have been alleviated by conventional automated processing equipment, problems still remain. Such problems relate to the efficiency and reliability of the conventional automated, equipment and the ability to achieve the desired consistency in the final product.

Therefore, there is a long-recognized need in the food processing industry and more specifically in the area of meat cutting and processing for an efficient and effective automated cutting assembly. Such an improved cutting assembly should be capable of accurately cutting meat into the desired shapes and sizes on a consistent basis, while eliminating the above noted disadvantages associated with manual processing. Further, an improved and proposed cutting assembly should be structured so as to reliably and efficiently cut through heavy gristle, muscle membrane, etc., thereby eliminating or significantly reducing the problems and/or disadvantages commonly associated with known or conventional automatic cutting assemblies. Further, an improved and proposed meat cutting assembly should be capable of timely processing large quantities of meat and other appropriate food products such as by passing the product along a defined path of travel. Moreover, the structuring of such an improved cutting assembly as a modular cutting unit would increase its versatility by allowing it to be an operative component of a more extensive processing line, where other processing steps may be performed on the product.

In addition, a preferred and proposed meat cutting assembly could be automated while being constructed into the aforementioned modular unit, thereby facilitating its placement or removal into and out of an operative position along a more extensive processing line comprised of other operative components. Further, a preferred and proposed meat processing assembly May also be operatively structured to perform a tenderizing procedure on the meat or other food product passing along the path of travel. It is of course recognized that current tenderizing procedures May include the application of a plurality of penetrating cuts to the meat or food product. However, in situations where additional tenderizing is required is commonly necessary to pass the meat or food product along the predetermined path of travel multiple times in order to apply penetrating cuts to the meat in different directions. Obviously, the disadvantages of such known types of tenderizing procedures is unnecessarily labor intensive since the meat or food product may be required to pass a plurality of times along the path of travel in order to acquire sufficient penetrating cuts, which may be differently oriented. Improvements in a preferred tenderizing assembly should be operative to overcome disadvantages of the type set forth above preferably by providing sufficient tenderizing of a given food product during a single pass thereof along the predetermined path of travel.

Finally, such a proposed and improved meat cutting assembly should include an overall design and structure which enables a continued functioning of a tenderizing assembly even under relatively harsh operating conditions.

SUMMARY OF THE INVENTION

The present invention is directed to the tenderizing of a food product specifically including, but not limited to, a meat product. As such, at least one preferred embodiment includes an assembly structured to accomplish food tenderization by performing a multi-directional, penetrating cut on the food product, during a single pass thereof through and along a predetermined path of travel. As explained in greater detail hereinafter, the aforementioned multi-directional penetrating cut may be in the form of a bi-directional cut.

More specifically, one embodiment of the assembly of the present invention includes one or one or more processing sections operatively disposed in direct interaction with the meat or other food product, during a single pass thereof, along the path of travel. Further, each of the one or more processing sections includes two elongated cutting rollers rotationally mounted and extending transverse to a length of the path of travel. Each of the two cutting rollers includes a plurality of blades rotatable there with and collectively extending along at least a portion of the length of a respective one of the cutting rollers, in spaced relation to one another. In at least one embodiment, the plurality of blades associated with each of the cutting rollers extends along at least a majority or substantially the entirety of the corresponding cutting roller. Further, the length of each of the cutting rollers and the positioning of the corresponding plurality of blades thereon will extend across at least a majority but preferably the entirety of the transverse dimension of the path of travel along which the meat or food product travels. Further, each of the plurality of blades associated with each of the cutting rollers includes a plurality of blade segments, wherein each blade segment includes at least one cutting edge disposed on and at least partially defining an outer free end of the corresponding blade segment, as well as at least a portion of the outer periphery of the respective blade. Further, the plurality of blade segments of each blade extends radially outward therefrom. As a result, the plurality of cutting edges of the plurality of blade segments of a common cutting blade extend, in spaced relation to one another along at least a majority or substantially the entirety of the outer periphery of the corresponding blade.

Upon rotation of the respective cutting rollers, the corresponding cutting edges of each of the corresponding blades will penetrate the meat or other food product as it passes along the path of travel. The structural and operational features of the present invention allow a penetration of each of the cutting edges to a substantially greater depth than normally accomplished with conventional devices of this type. In turn, this provides a greater degree of tenderization, without requiring more than one pass of the meat along the path of travel or without damaging the meat or other food product being processed.

The aforementioned "multi-directional cut" and the preferred "bi-directional cut", during a single pass of the food product along the path of travel, is accomplished by orienting the cutting edges of a first of the two cutting rollers of each processing section in substantially transverse relation to the plurality of cutting edges on a second of the two cutting rollers of the same processing section. As a result, the cutting edges of each of the plurality of blades of a first cutting roller will be correspondingly disposed in substantially transverse relation to the cutting edges on the plurality of blades of a second cutting roller of the same processing section. Therefore, the cutting edges of each of the first and second cutting rollers may also be disposed in a preferred and/or specific alignment or orientation relative to the length of the path of travel.

In one embodiment, by way of example and as described in greater detail hereinafter, the plurality of cutting edges of one of the cutting rollers, such as the first cutting roller, may be oriented in a substantially longitudinal alignment with the length of the path of travel. In cooperation therewith, the plurality of cutting edges on the other or second cutting roller, of a common processing section would be oriented in substantially transverse relation to the length of the path of travel. Moreover, the relative position, orientation and/or spacing of the plurality of blades, blade segments and cutting edges on each of the cutting rollers, of a common processing section, would accomplish a predetermined penetration pattern. Further by way of example and as generally described above, each of the two cooperatively disposed, interacting cutting rollers may form a predetermined penetration pattern which includes a multi-directional cut which in some embodiments preferably includes a bi-directional cut. Such a bi-directional cut results in the cutting edges of the plurality of blades of each of the cooperatively disposed cutting rollers, of the same processing section, penetrating the meat or food product during a single pass thereof as it travels along the length path of travel.

Further, such a preferred one of a possible plurality of penetration patterns is at least partially defined by adjacent ones of the plurality of cutting edges of each of the first and second cutting rollers being longitudinally off-set from one another along the length of the corresponding one of the cutting rollers. In addition, the predetermined and/or preferred penetration pattern May also be the result of the plurality of blades and/or cutting edges of each of the first and second cutting rollers of the same processing section being disposed in "intermeshing relation" or "intermeshing alignment" relative to one another during a concurrent rotation of the two cutting rollers. Such an intermeshing relation or alignment may be more specifically described by each of the plurality of blades and/or cutting edges of each of the first and second cutting rollers, of the same processing section, moving between the plurality of blades of the other of the first and second cutting rollers of the same processing section. Therefore, the intermeshing alignment or relation comprises the blades and/or cutting edges of at least one of the two cutting rollers, of the same processing section, being disposed in "stripping" relation between the plurality of blades and/or cutting edges of the other of the two cutting rollers, of the same processing section, during concurrent rotation of the two cutting rollers. Such a "stripping" relation of the plurality of blades of at least the second cutting roller relative to the blades of the first cutting roller will serve to remove any meat or food product which inadvertently is retained or "stuck" between the cutting blades of the first cutting roller. As also described in greater detail hereinafter, another structural feature may include a greater spacing between adjacent ones of the blades of the first cutting roller than is present between the blades of the second cutting roller.

As used herein, the term "first cutting roller" and "second cutting roller" is meant to clarify or distinguish the two cutting rollers of a same processing section from one another. As such, the disposition, operative features, structures, etc. of the first and second cutting rollers may be reversed. Accordingly, by way of example and as at least partially indicated herein, the first cutting roller of each of the one or more processing sections would have the plurality of blades disposed, structured and oriented such that the cutting edges associated therewith would be disposed in substantially longitudinal alignment with the length of the path of travel. In cooperation therewith, the plurality of cutting edges of the plurality of blades associated with the second cutting roller, of the same processing section, would be disposed, structured and oriented such that the cutting edges thereof would be in substantially transverse relation with the length of the path of travel. In such a structural modification, there would be a greater spacing between adjacent ones of the plurality of blades of the first cutting roller. As indicated, the existence of this larger spacing may increase the tendency of food or meat portions being retained or stuck between the blades of the first cutting roller. The aforementioned intermeshing alignment or arrangement of the two cutting rollers of the same processing section and the corresponding blades associated there with would result in the blades of at least the second cutting roller passing between correspondingly disposed adjacent blades of the first cutting roller. Therefore, the "stripping" by the blades of the first cutting roller of any meat or food portion inadvertently retained there between would result.

Additional structural and operative features of one or more of the preferred embodiments of the assembly of the present invention include each of the cutting edges having a substantially elongated configuration and disposed on an outer, free end of the corresponding blade segment. Further, the blade segments of the plurality of blades of at least one of the cutting rollers of the same processing section may have a substantially curved configuration along the length thereof. Moreover, the curved configuration of the blade segments may be more specifically defined and/or described as having a substantially convex face, which may be a leading face or surface, and an oppositely disposed, substantially concave face, which may be a trailing face or surface, as the corresponding cutting roller rotates relative to the path of travel and the direction of travel of the food product passing along the length thereof. Such a curved configuration of the plurality of blade segments of at least one of the cutting rollers of a common processing section has the effect of facilitating penetration and removal of the corresponding cutting edges, as well as performing the aforementioned "stripping" procedure.

It is emphasized that the blade segments of one or both of the cutting rollers of each processing section is not limited to the aforementioned curved configuration. To the contrary, each or a predetermined number of the blade segments of the two cutting rollers may have a substantially linear or "straight-line" configuration as they extend radially outward from a corresponding one of the blades.

Additional structural and operative features of one or more of the embodiments of the subject tenderizing assembly includes both the first and second rollers of one processing section being located on a common side of the path of travel of the meat or food product traveling there along. However, when at least two processing sections are utilized, each of the processing sections may be disposed on opposite sides of the path of travel. As such, the meat or food product will pass between the two oppositely disposed processing sections as it travels along the path of travel. As indicated, each of the two rollers of the same processing section may preferably be disposed in longitudinally adjacent and/or parallel relation to one another along at least a portion of their respective lengths. Moreover, when at least two of the processing sections are used and disposed on opposite sides of the path travel, the first and second cutting rollers of each processing section may be disposed in transverse relation to the path of travel. In contrast, the first and second cutting rollers of one of the oppositely disposed processing sections, may be disposed in substantially longitudinal alignment with the second and first cutting roller respectively of the correspondingly disposed processing section located on the opposite side of the path of travel.

Yet additional structural and operative features of one or more embodiments of the tenderizing assembly include a substantially "modular construction". As such each of the cutting rollers of each of the one or more processing sections may be easily removed, replaced, realigned, repositioned, etc. independent of any of the other cutting rollers associated with the same processing section or different ones of a plurality of the processing sections concurrently being used. As a result, the versatility of the processing procedure may be significantly enhanced by easily varying the number, location, relative position and resulting interaction of one or more of the processing sections and the cutting rollers associated therewith. Such a modular construction also applies to the provision of at least one, but more practically, a plurality of flattening or compression rollers or other type of operative components associated with the path of travel and disposed and structured to interact with the meat and/or food product during a single pass thereof along the path of travel.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like references refer to like parts throughout the several views of the drawings.

DETAILED DESCRIPTION OF THE PREFERRED EMBODIMENT

Figure 1:
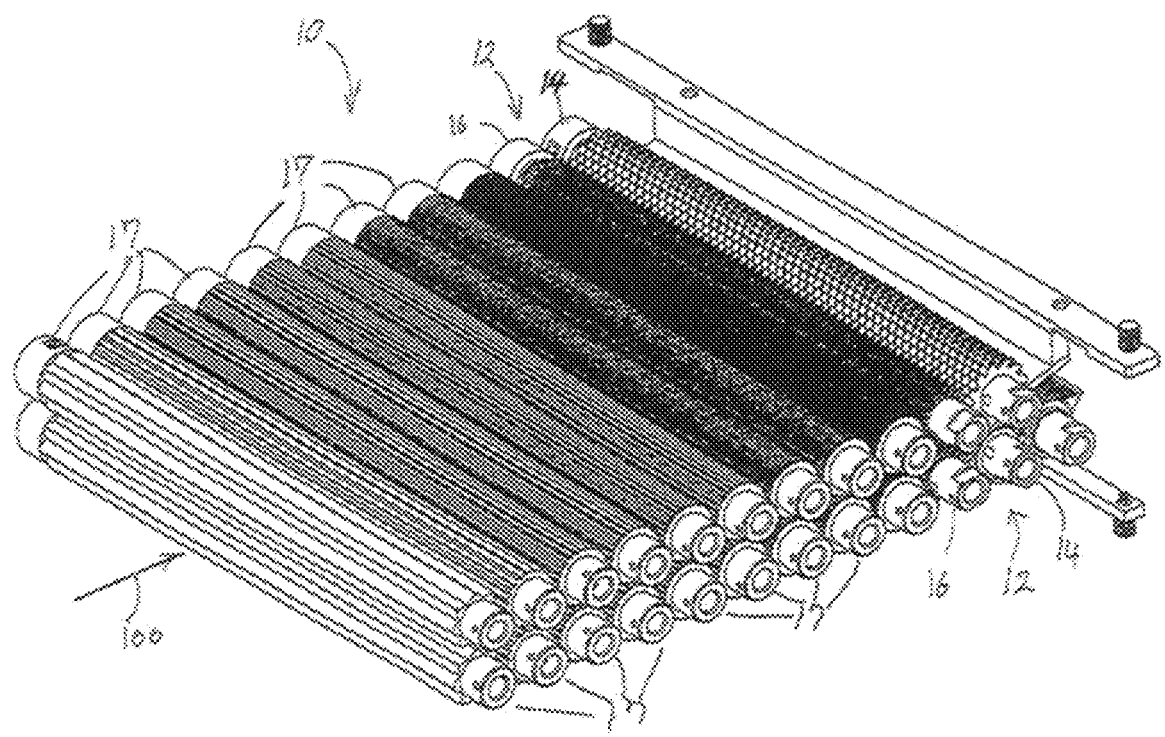
FIG. 1 is a perspective view of one embodiment of the tenderizing assembly of the present invention.
Figure 2:
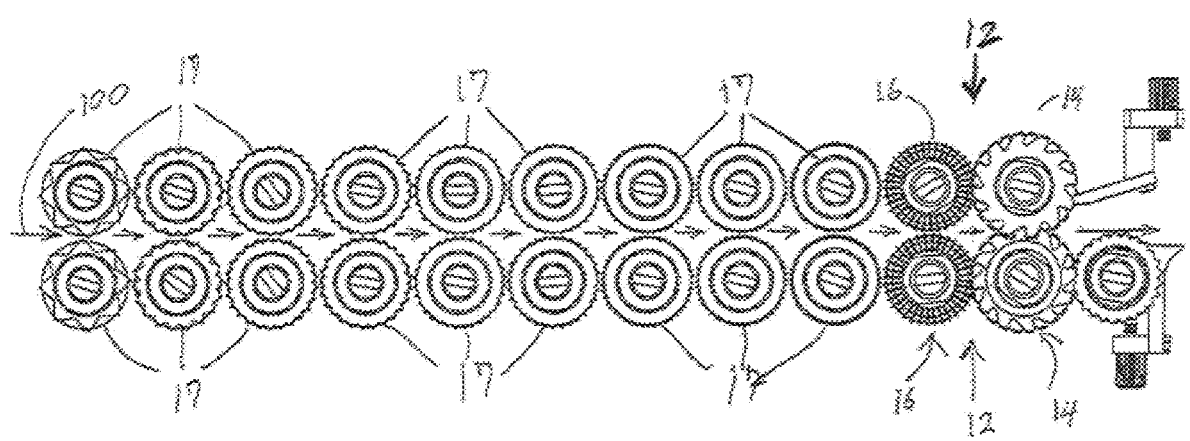
FIG. 2 is an end view of the embodiment of FIG. 1.

As represented in the accompanying Figures, the present invention is directed to a tenderizing assembly generally indicated as 10. As indicated in greater detail hereinafter, the tenderizing assembly 10 in its various embodiments and/or structural modifications is operative to tenderize meat or other food products passing along a path of travel 100. For purposes of clarity the path of travel 100 is schematically represented by one or more directional arrows wherein the direction of travel of the meat or other food product is also indicated by the representative directional arrows 100. More specifically, tenderization of the meat or other food product is preferably accomplished by performing a plurality of multi-directional cuts on the food product, during a single pass thereof, along the path of travel 100. Further, in at least one preferred embodiment the multi-directional cuts may be more specifically defined by a plurality of bi-directional cuts.

Therefore, the tenderizing assembly 10 comprises at least one, but more practically, one or more processing sections, generally indicated as 12. Further, each of the one or more processing sections 12 includes a plurality of at least two cutting rollers 14 and 16. Each of the cutting rollers 14 and 16 of the same processing section 12 are disposed in substantially adjacent relation to one another along at least a portion of their respective lengths. Also, the length of each of the cutting rollers 14 and 16 are disposed transversely across at least a majority and preferably the entirety of the path of travel 100 along which the meat or other food product travels as indicated.

Figure 3:
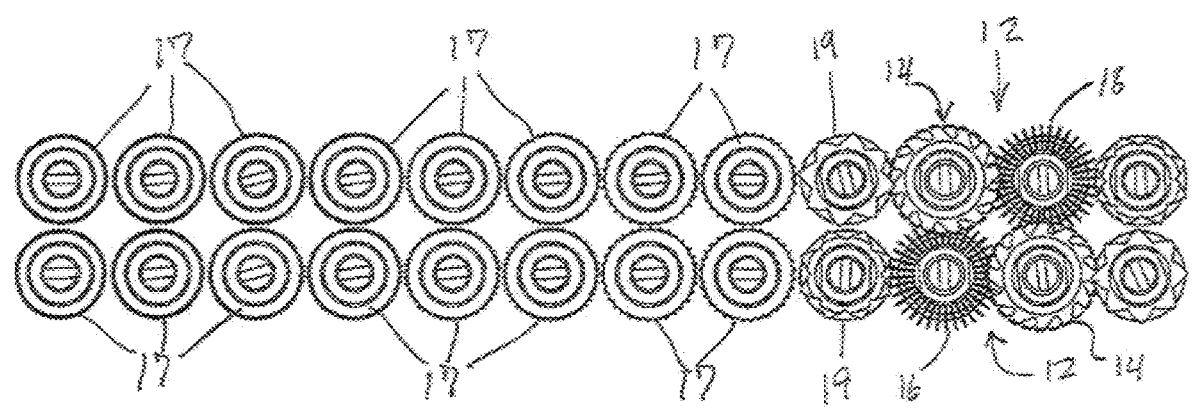
FIG. 3 is an end view of another embodiment of the present invention.
Figure 4:
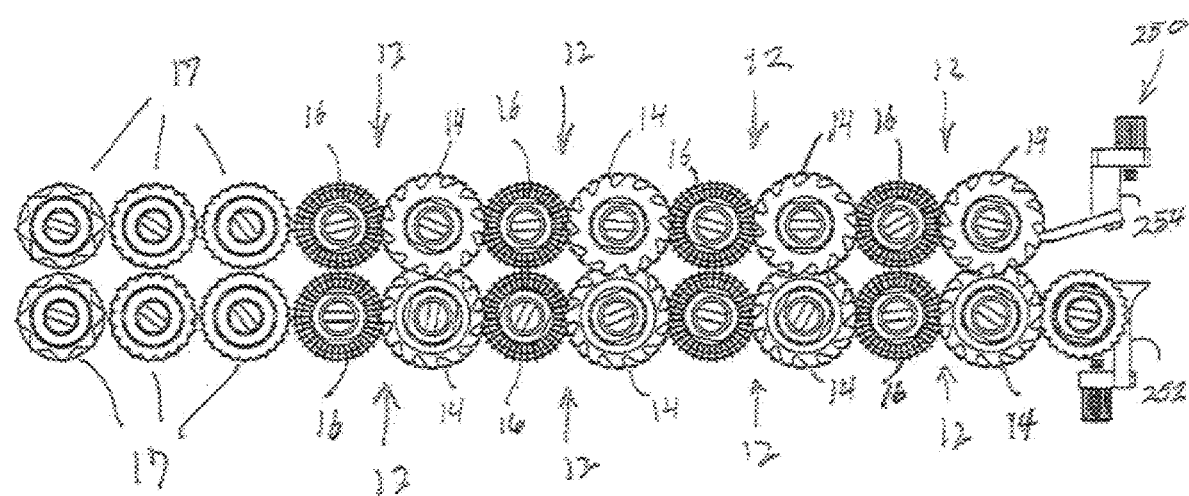
FIG. 4 is an end view of yet another preferred embodiment of the present invention.
Figure 5:
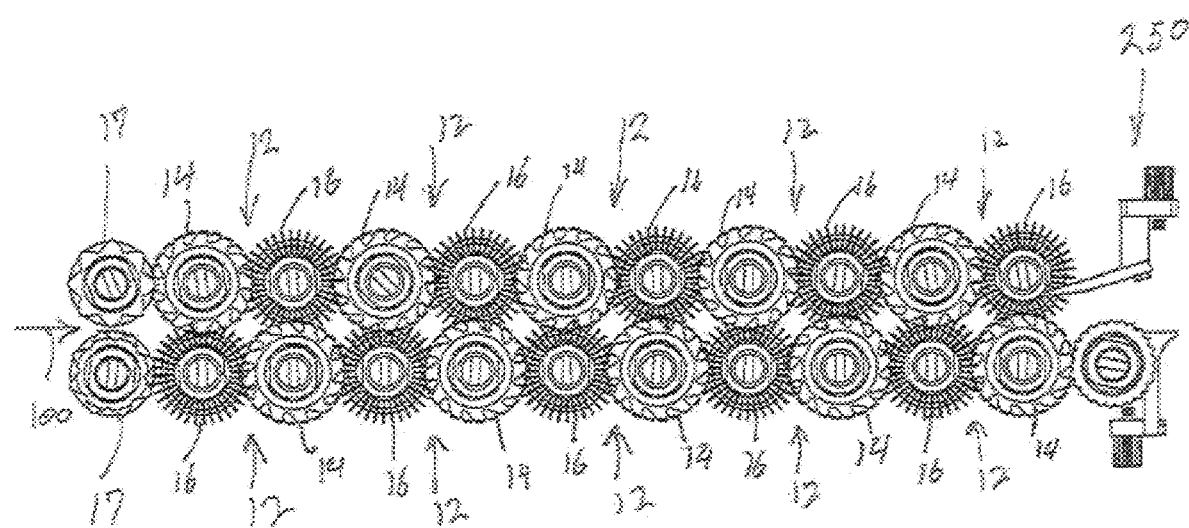
FIG. 5 is an end view of yet another preferred embodiment of the present invention.
Figure 14:
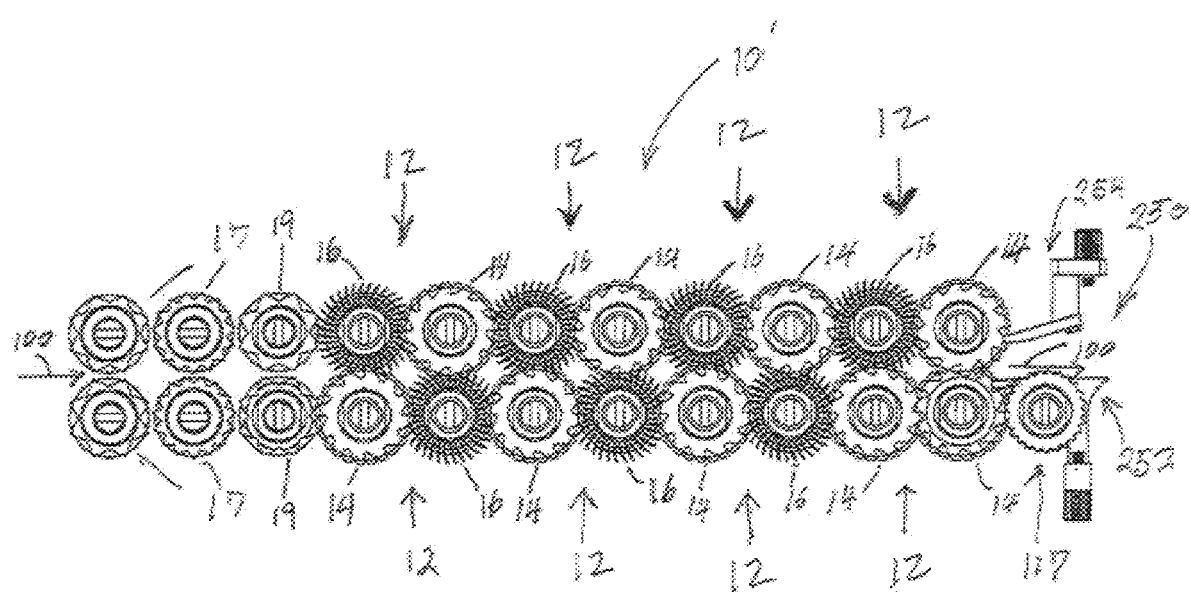
FIG. 14 is a side view of another preferred embodiment of the tenderizing assembly of the present invention incorporating a stripper assembly.

As also represented in FIGS. 1-5, a plurality of additional processing rollers 17 may also be disposed along the path of travel 100. The number and purpose of the various processing rollers 17 may vary and include, but not be limited to, driving rollers, flattening rollers, etc. Also, the plurality of processing rollers 17 may be located upstream or downstream along the path of travel 100 relative to the location of the one or more processing sections 12. In addition, scraper rollers 19 represented in FIG. 3, and also represented in FIG. 14, are provided downstream of the blades 14 and 16 and are structured to serve as scrapers to help remove the meat from the blades 16 and/or 14. It is of further note and as represented in FIG. 3, the direction of travel of the meat along the path 100 may be opposite to that represented in FIG. 14, wherein each of the embodiments of FIGS. 3 and 14 represent the scraper rollers 19 located downstream of the blades 16 and 14.

It is further emphasized that the number of processing sections 12 may vary dependent, at least in part, on the degree of tenderizing to which a meat product or other food product is intended to be subjected. Therefore, FIGS. 1-5 also show a different number of processing sections 12 being utilized and being operatively disposed along the aforementioned path of travel 100. As will be explained in greater detail hereinafter, and as distinguished in a comparison of FIGS. 2-3 and 4-5 cutting rollers 14 having blade segments 30 may be longitudinally aligned and parallel with a cutting roller 14 associated with a different or opposing processing section 12 located on opposite sides of the path of travel 100. In contrast, the versatility of the tenderizing assembly 10 of the present invention is also demonstrated by the fact that a processing roller 14 having blade segments 30 may be longitudinally aligned and opposed to a cutting roller 16 of a different processing section 12, on an opposite side of the path of travel. For purposes of clarity, the term "longitudinally aligned" may be considered a substantial, but not necessarily precise, alignment.

Further, each of the cutting rollers 14 and 16 include a plurality of blades 20 or 22 disposed in spaced relation to one another and collectively extending along at least a portion of the length of the respective cutting rollers 14 and 16. As represented in FIGS. 9-12 structural details of the various embodiments or structural modifications of the plurality of blades 20, 20' and 22, 22', are represented. More specifically, each of the cutting blades 20, 20' and 22, 22' include a base 24 structured to be removably connected but fixedly secured to a corresponding one of the rollers 14 and 16. In the embodiments represented, each of the bases 24 includes a protruding key member 26 secured to and extending radially inward from an interior periphery 27 of each blade base 24. Further, each of the bases 24 include a central opening or aperture 28 dimensioned and configured to receive the length of the corresponding roller 14 or 16 there through in coaxial relation to the base 24. Each of the cutting rollers 14 and 16 may include one or more elongated keyways, channels, slots, etc. 26' in which the keys 26 of the plurality of cutting blades 20, 20' and 22, 22' and 122 are disposed (see FIGS. 9C and 16B). As a result of the connecting interaction between the keys 26 and the key ways or channels 26' formed in the cutting rollers 14 and 16, of each of the plurality of blades 20, 20' and 22, 22' and 122 rotate with the corresponding one of the plurality of cutting rollers 14 and 16. Also, in at least one embodiment, the aforementioned keyways 26' in the cutting blades 14 and 16 are also preferably staggered relative to one another so as to facilitate positioning and removal of the corresponding cutting blades and establish a preferred penetration pattern 200, further described herein with reference to at least FIG. 13, where in such preferred penetration pattern 200, avoids a double cut/penetration of the meat at the same location, which can result in product loss or inconstancy.

Figure 9:
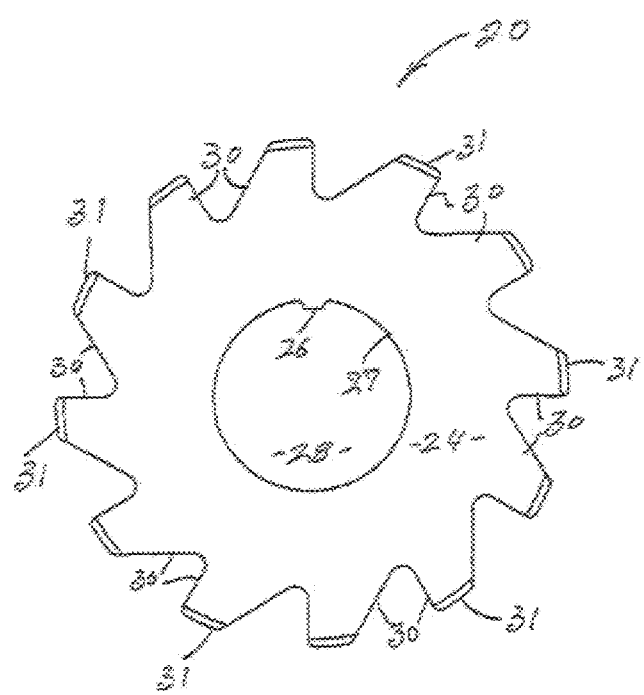
FIG. 9 is an end view of one embodiment of a cutting blade which may be incorporated in the embodiments of FIGS. 1-8.
Figure 9A:
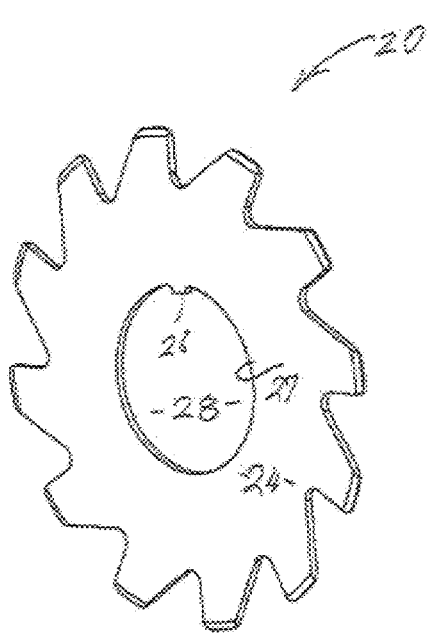
FIG. 9A is a perspective detailed view of the cutting blade of the embodiment of FIG. 9.
Figure 9B:
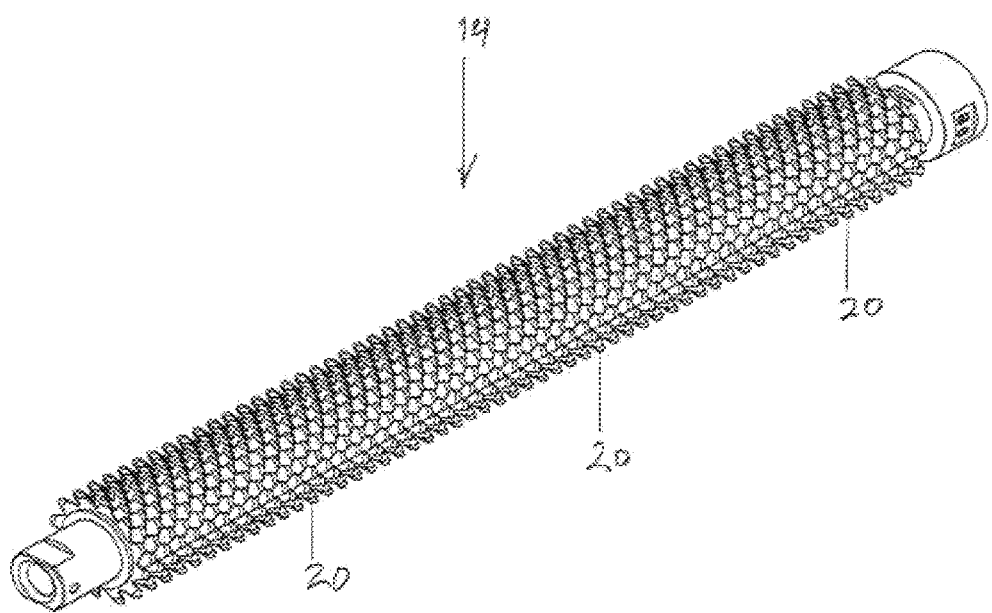
FIG. 9B is a perspective view of one embodiment of a cutting roller including cutting blades, as represented in the embodiment of FIGS. 9 and 9A, operatively mounted thereon.
Figure 9C:
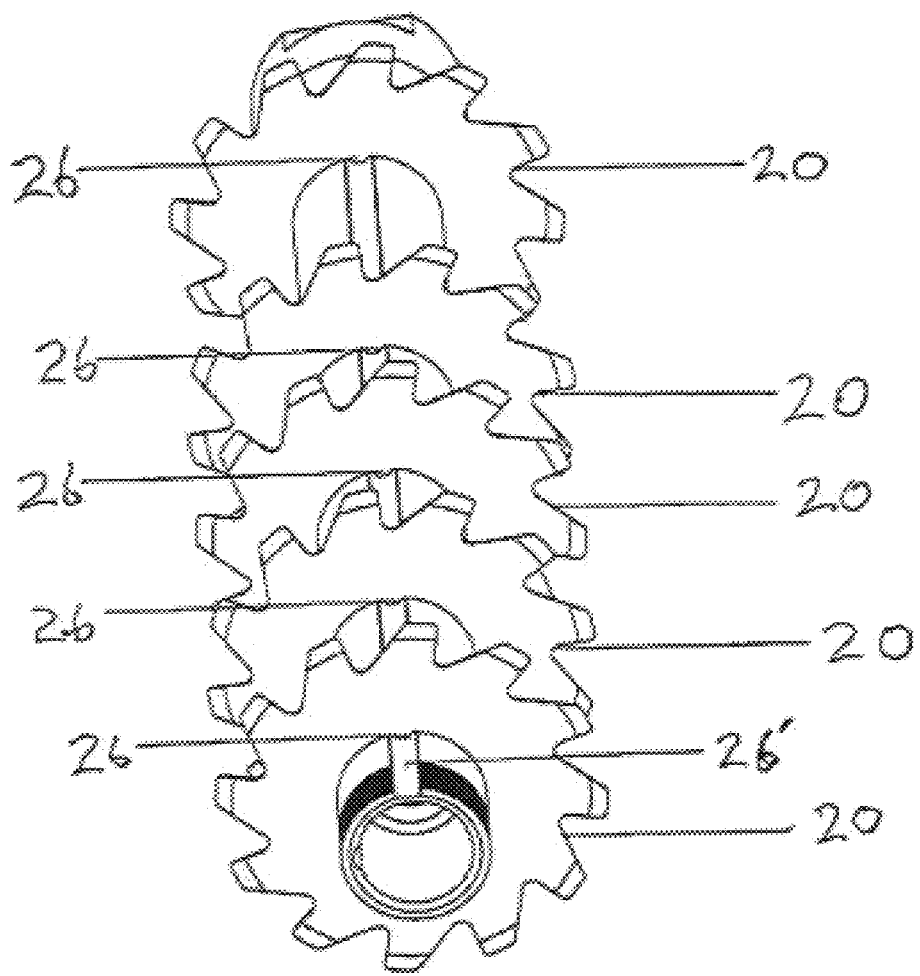
FIG. 9C is a perspective view in exploded form of the assembling of the cutting blades of the embodiment of FIGS. 9 and 9A, on a cutting roller as represented in the embodiment of FIG. 9B.
Figure 10:
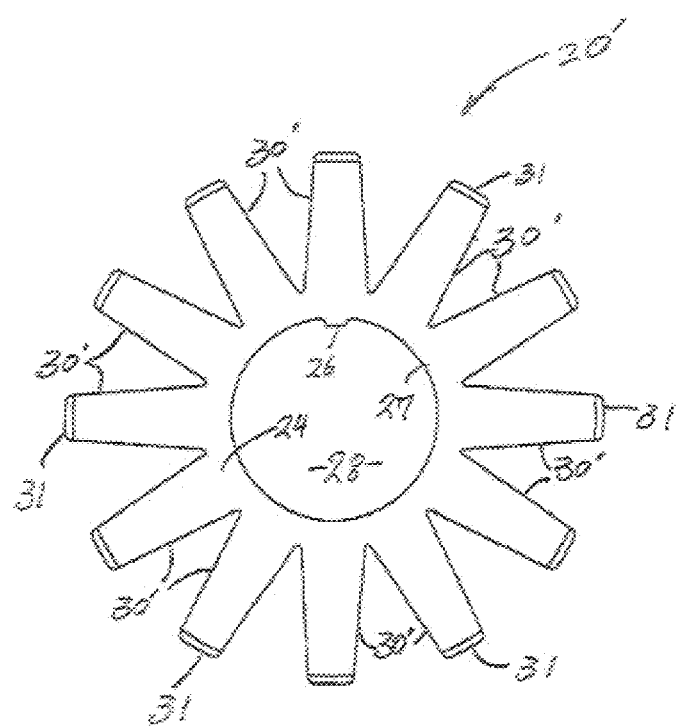
FIG. 10 is an end view of one embodiment of certain structural components of the embodiments of FIGS. 1-8.
Figure 10A:
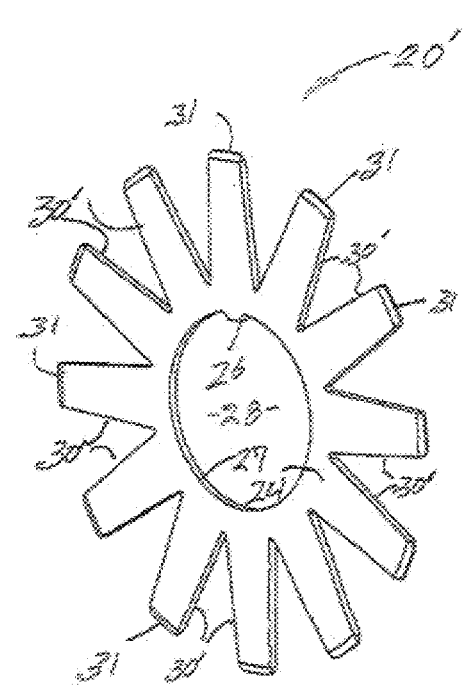
FIG. 10A is a perspective detailed view of the embodiment of FIG. 10.

With primary reference to FIG. 9C, a plurality of the blades 20 (or 20') are mounted on one of the cutting rollers, such as a first cutting roller 14, in a predetermined spaced relation to one another along at least a portion of the length and/or more practically along a substantial entirety of the length thereof. Such mounting or operative connection of the cutting blades 20 relative to one another is accomplished by aligning the key member 26 on each of the cutting blades 20 (or 20') with the keyway 26' and thereafter disposing each of the plurality of blades 20 in adjacent but at least a predetermined spaced relation to one another in a substantially horizontally stacked array as represented in FIG. 9B. In order to assure an adequate, predetermined spacing between the cutting blades 20, or 20' on the cutting roller 14, a spacer or like structure (not shown for purposes of clarity) may be disposed between adjacent ones of the plurality of cutting blades 20 or 20'.

In cooperation therewith, a plurality of the cutting blades 22 or 22' are mounted, in a predetermined spaced relation to one another, along at least a portion of the length of the other of the two cutting rollers, such as a second cutting roller 16, and rotate therewith. It is emphasized that the terms first cutting roller and second cutting roller are used for purposes of clarity in distinguishing the two cutting rollers, associated with each of the one or more processing sections 12, from one another. It is further emphasized that the terms first and/or second are not necessarily meant to indicate the order or position of a given cutting roller relative to another cutting roller, the path of travel 100 or the meat or food product traveling along the path of travel 100. Moreover, the tenderizing assembly 10 of the present invention provides enhanced versatility due to the provision of a modular construction and/or assembly. As such, each of the plurality of two cutting rollers 14 and 16 may be independently and removably disposed in different operative positions along the length of the path of travel 100 to facilitate repair, replacement and/or alter the processing procedure intended to be performed on the food product passing along the path of travel 100.

With further reference to FIGS. 9 through 12, the cutting blades 20, 20' also include a plurality of blade segments 30 and 30' respectively, each including a cutting edge 31. The blade segments 30 and 30' differ from one another due to a difference in their respective shapes, dimensions, orientations etc. More specifically, as represented in FIGS. 9-9A, the plurality of blade segments 30 have an at least partially angular orientation relative to the central axis of the corresponding base 24 of the blade 20. In contrast the blade segments 30' of the cutting blades 20' have a substantially straight line or linear configuration which coincide with and extend radially outward from the central longitudinal axis of the corresponding cutting blades 20'.

Figure 8:
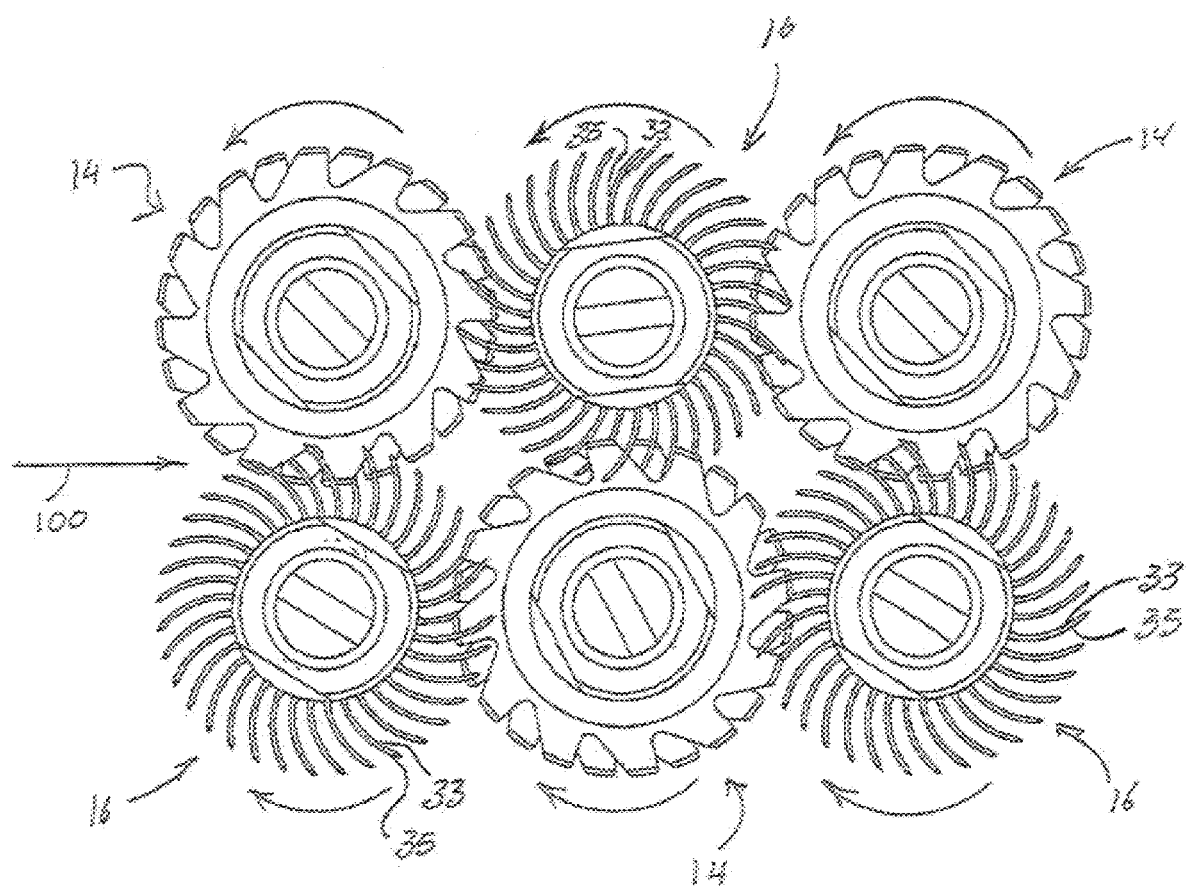
FIG. 8 is an end view of the structural components of at least some of the embodiments of FIGS. 1-7.
Figure 11:
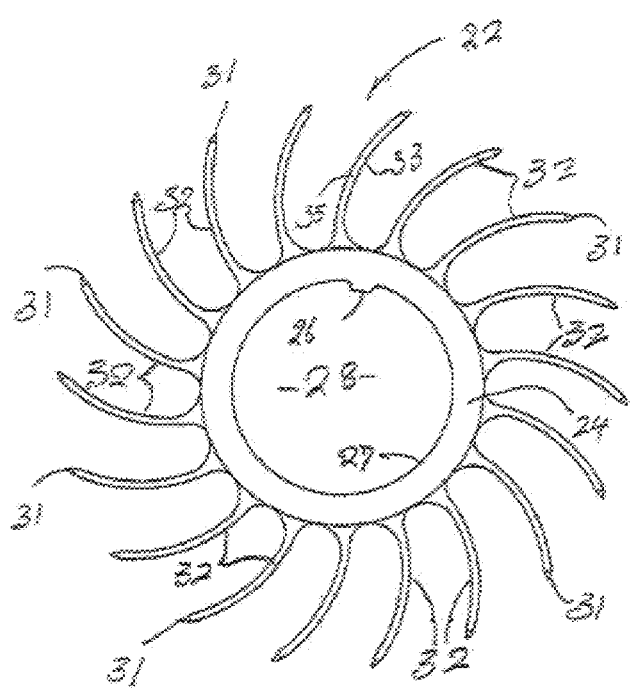
FIG. 11 is a detailed end view of yet another embodiment of certain structural components of the embodiments of FIGS. 1-8.
Figure 11A:
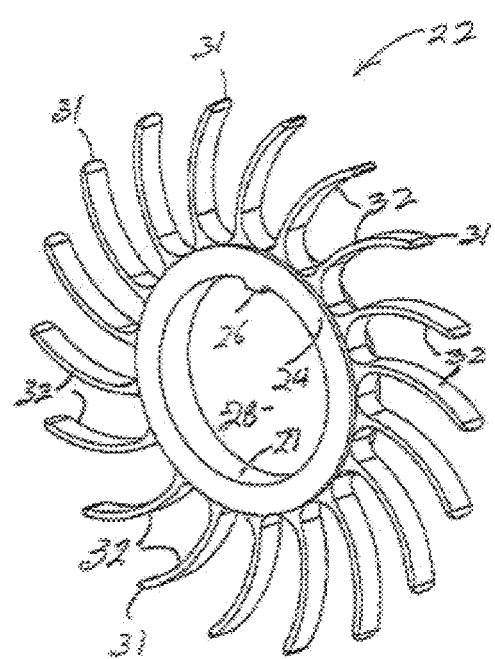
FIG. 11A is a perspective detailed view of the embodiment of FIG. 11.
Figure 12:
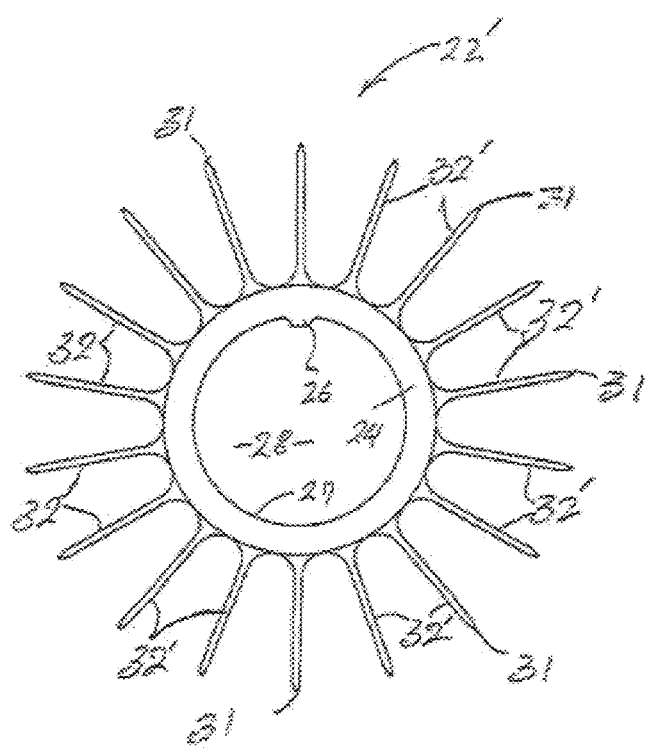
FIG. 12 is a detailed end view of yet another embodiment of a certain structural components of the embodiments of FIGS. 1-8.
Figure 12A:
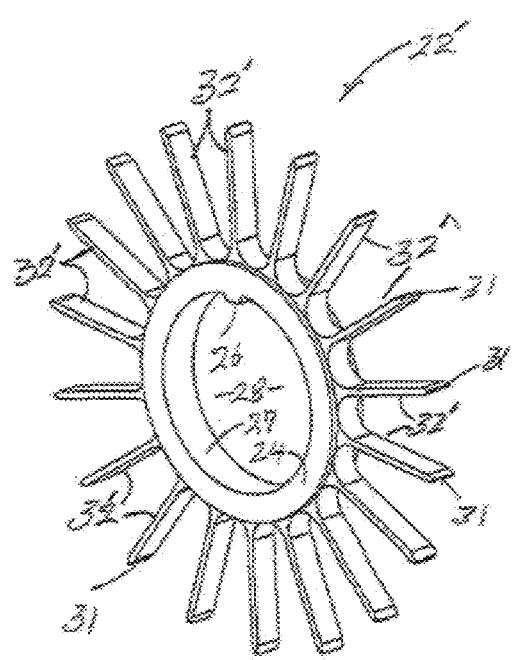
FIG. 12A is a perspective detailed view of the embodiment of FIG. 12.

As represented in FIGS. 11-12A, each of the cutting blades 22, 22' include a plurality of blade segments 32 disposed in spaced relation to one another and including cutting edges 31 collectively extending along at least partially defining an outer periphery of each of the blades 22, 22'. Distinguishing features of the blade segments 32 from the blade segments 32' include a difference in shape, size, orientation, etc. Therefore, as represented in FIGS. 11-11A, each of the plurality of blade segments 32 have a substantially curvilinear configuration along a majority or entirety of their respective lengths. In addition, the represented curvilinear configuration May include a concave face or surface 33 and an oppositely disposed convex face or surface 35. When in operation and mounted on corresponding ones of the cutting rollers 16, each of a plurality of spaced apart blades 22 rotate with the corresponding cutting roller 16 in a preferred rotational direction. During at least one direction of rotation the concave face or surface 33 may be considered a trailing face or surface and the convex face or surface 35 may be considered a leading face or surface of the respective blades 22, as at least partially represented in FIG. 8.

As another structural modification or embodiment, the blade segments 32' preferably include an elongated, linear, and/or substantially straight-line configuration, as represented in FIGS. 12, 12A. As also represented, each of the cutting edges 31 of the blade segments 32' are disposed in predetermined spaced relation to one another so as to collectively define and/or extend about an outer periphery of the corresponding cutting blade 22'. As also noted each of the blade segments 30, 30' and 32, 32' include an outer or distal penetrating cutting edge 31 positioned and oriented to first enter or penetrate the meat or food product passing along the path of travel 100 during the concurrent rotation of the cutting rollers 14 and 16 on which the plurality of blades 20, 20' and/or 22, 22' are mounted.

Figure 6:
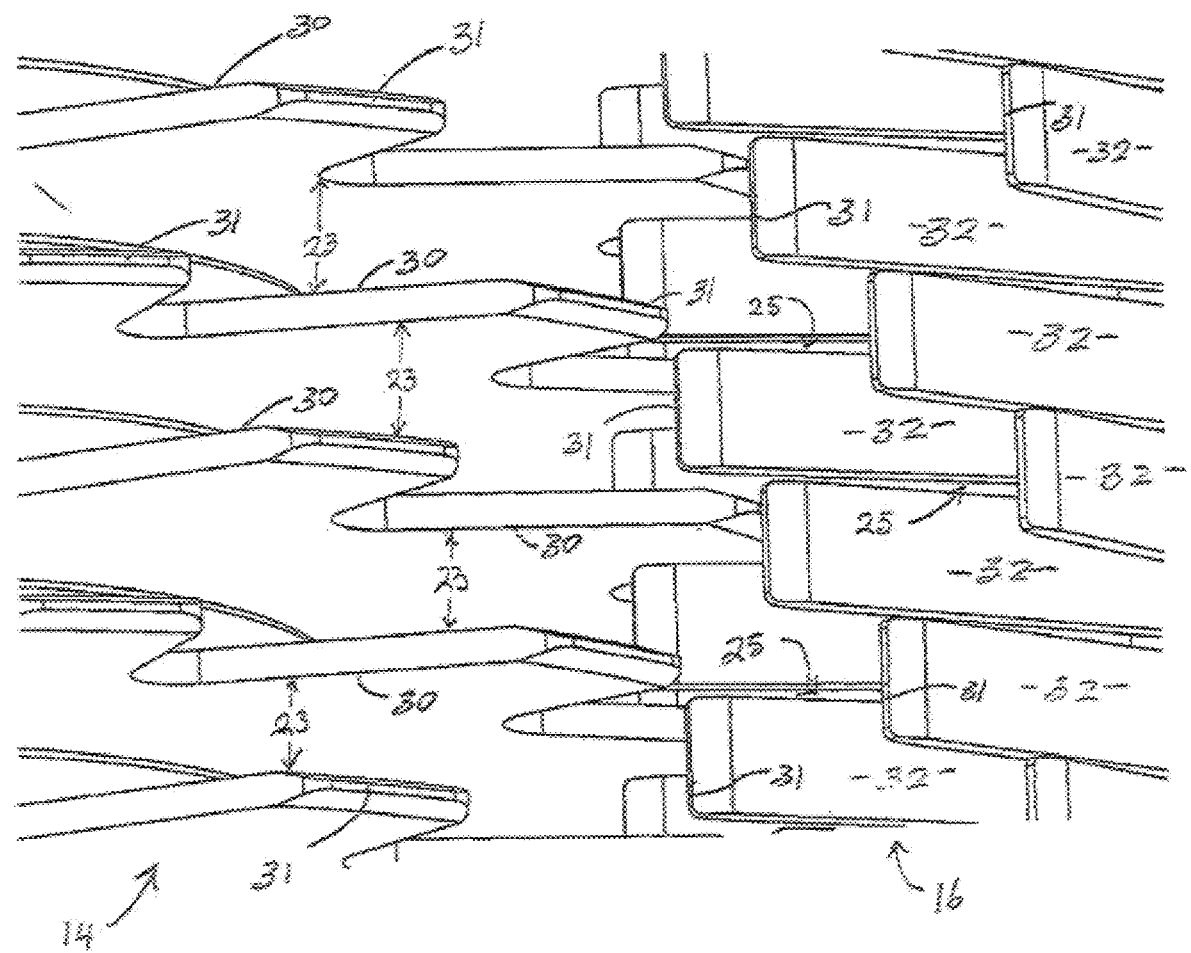
FIG. 6 is a detailed perspective view in partial cutaway representing structural features of the embodiment of FIGS. 1-5.
Figure 7:
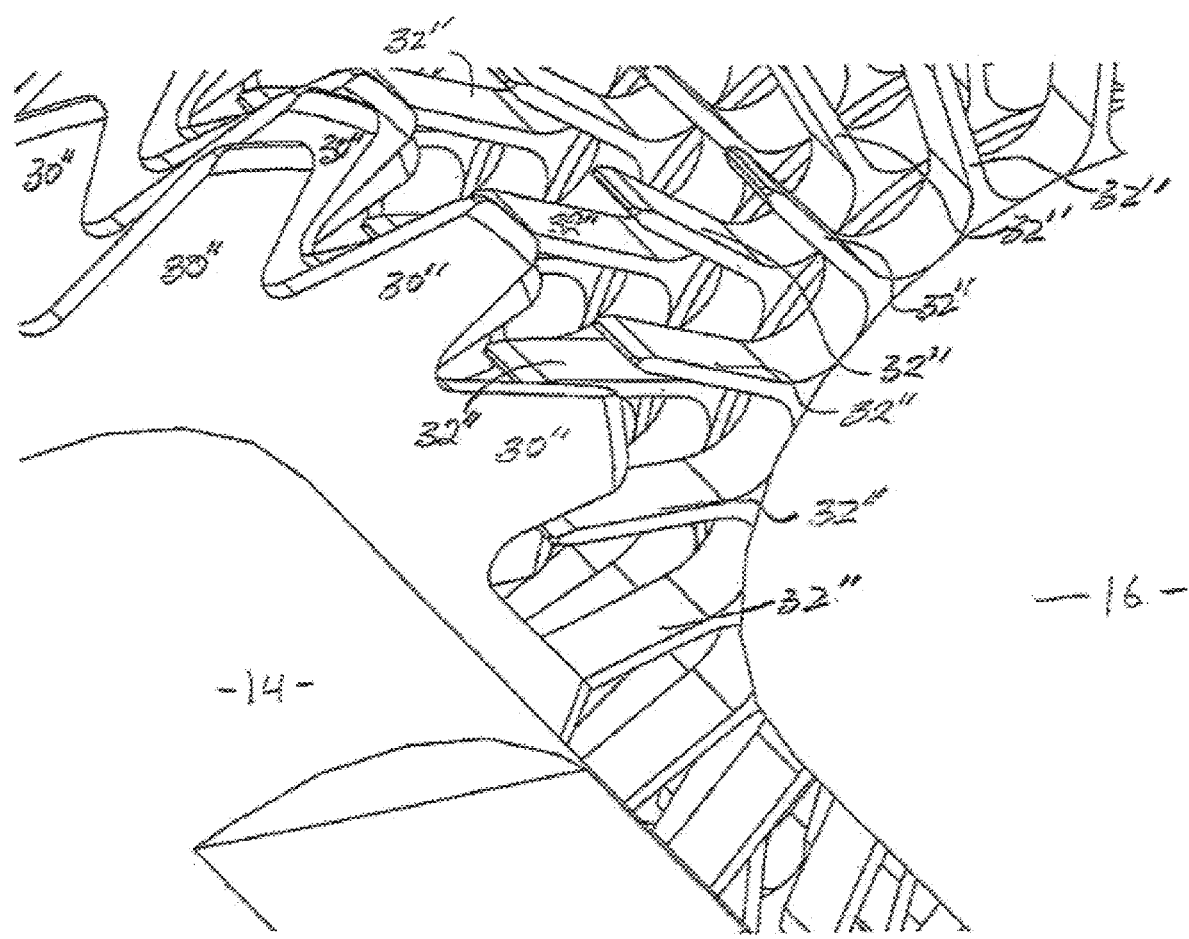
FIG. 7 is a perspective detailed view of the structural features represented in FIG. 6.

With primary but not exclusive reference to FIGS. 6-7, the aforementioned multi-directional and preferred bi-directional cut into the meat or food product passing along the path of travel 100 is accomplished by the blade segments 30 and corresponding cutting edges 31 of one or a first of the cutting rollers 14 being disposed in transverse relation to the blade segments 32 and corresponding cutting edges 31 of the other or second cutting roller 16 associated with the same processing section 12. In at least one embodiment, the relative transverse orientations of the blade segments 30 and 32 and corresponding cutting edges 31 of the cutting rollers 14 and 16, May be further and more specifically defined by orienting the plurality of cutting edges 31 in a substantially longitudinal alignment with the length of the path of travel 100. In cooperation therewith, the cutting edges 31 of the blade segments 32 of the other or second cutting roller 16 are disposed in a substantially transverse relation to the length of the path of travel 100. As also represented the predetermined spacing 23 between adjacent ones of the cutting blades 20 and corresponding blade segments 30 may be greater than the spacing 25 between the adjacent ones of the plurality cutting blades 22 and blade segments 32. As a result, the relative closeness or side-by-side, adjacent relation of the cutting blades 14 and 16 associated with each of the processing sections 12 is sufficient to provide an non-engaging, intermeshing relation or intermeshing alignment of the cutting blades 20 and 22 and their corresponding blade segments 30 and 32 of correspondingly disposed cutting rollers 14 and 16. Due at least in part to the predetermined spacing 23 and 25 between the cutting blades 20 and 22, such an intermeshing relation will result in a predetermined "penetration pattern" 200 formed in the meat or other food product with which each processing section 12 interacts, as schematically represented in FIG. 13.

Further, the resulting predetermined penetration pattern 200 may vary dependent, at least in part, on the relative orientations, dispositions, sizes, etc. of the intermeshing cutting blades 20, 22 and their corresponding blade segments 30 and 32 and cutting edges 31. However, it is emphasized that the aforementioned FIG. 13 provides a schematic representation of one of a possible plurality of preferred penetration patterns resulting from applying a multi-directional or bi-directional cut into the meat or food product from each of the one or more processing sections 12 interacting with the meat or food product being processed. The intermeshing relation or intermeshing alignment resulting in a preferred or predetermined penetration pattern 200 is also accurately described by each of the plurality of blades 20, 20' and 22, 22' as well as corresponding ones of the blade segments 30, 30' and 32, 32' and corresponding cutting edges 31, of the same processing section 12, passing between one another. As also represented in FIGS. 6 and 7, the plurality of blade segments 32 are wider and correspondingly dimensioned to pass into and through the larger spaces 23 between the blades 20 and corresponding blade segments 30, 30'. Also, the transverse dimension of each of the blade segments 32 are equal to at least a majority of the transverse dimension of the correspondingly disposed spacing 23 thereby providing a "stripping action". Such a stripping action or stripping relation of the plurality of blade segments 32 of the second cutting roller 16 relative to the plurality of blade segments 30 of the first cutting roller 14 will serve to remove any meat or food product which inadvertently is retained or "stuck" between the blade segments 30 or 32.

Figure 13:
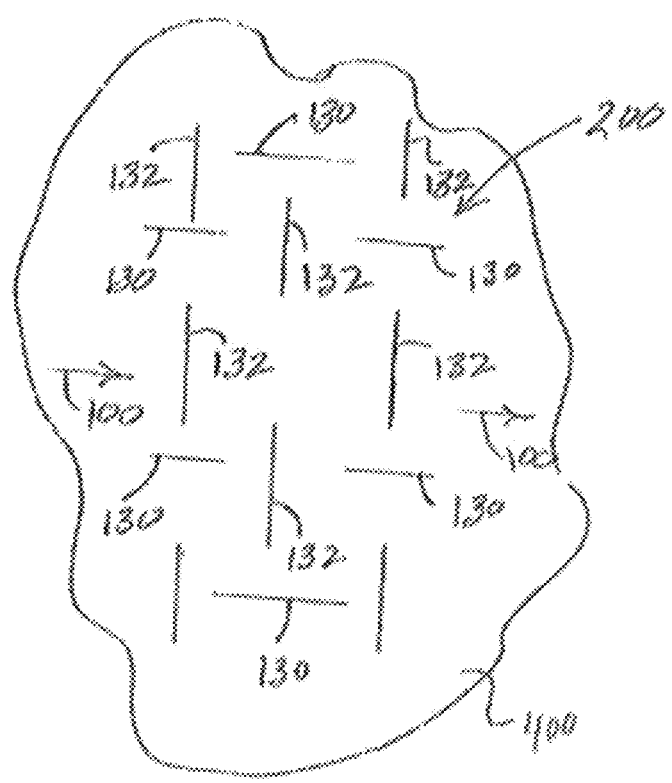
FIG. 13 is a schematic representation of one of a possible preferred penetration patterns formed in the meat or food product been processed.

The predetermined penetration pattern 200, such as of the type represented schematically in FIG. 13, is also the result of the blade segments 30 and 32 of each of the cutting rollers 14 and 16 being longitudinally offset from one another along the length of the corresponding one of the cutting rollers 14 and 16. In more specific terms, and with reference to FIG. 7, the blade segments 30" of adjacent ones of the cutting blades 20 of the first cutting roller 14 are not longitudinally aligned, but rather longitudinally off-set from one another. Similarly, and with further reference to FIG. 7, the blade segments 32" of adjacent cutting blades 22 of the same cutting roller 16 are not longitudinally aligned but are longitudinally off-set from one another, as set forth above. Therefore, the aforementioned predetermined penetration pattern 200, an example only of which is schematically represented FIG. 13, may be the combined result of the plurality of blade segments 30 and their cutting edges 31, associated with a first of the cutting rollers 14, being disposed in transverse relation to the blade segments 32 and their cutting edges 31 of the other or second cutting roller 16, concurrently to the cutting edges, such as at 30" and 32" being longitudinally off-set from adjacent ones of the correspondingly disposed cutting blades 20 and 22 respectively. As also set forth above, an example of the predetermined penetration pattern 200 is at least partially defined and/or determined by a greater spacing 23 existing between the plurality of blade segments 30 of a common cutting roller 14 than the spacing 25 between the plurality of blade segments 32 of a corresponding one of the cutting rollers 16.

For purposes of clarity and by way of non-limiting example, the predetermined penetration pattern 200 is further and more specifically described as comprising a first plurality of penetration marks 130 and a second plurality of penetration marks 132 disposed in substantially transverse relation to one another. As should be apparent from the additional description provided herein, the resulting multi-directional or bi-directional cut defining the predetermined penetration pattern 200 includes the penetration marks 130 formed by the cutting edges 31 of the plurality of blade segments 30 or 30', while the second plurality of penetration marks 132 are formed by the cutting edges 31 of the plurality of blade segments 32 or 32', in the meat or other food product 400 passing along the length of the path of travel 100. As should be apparent, a penetration pattern would also appear on the opposite side or surface of the meat or food passing along the path of travel 100, when processing sections 12 are disposed on opposite sides of the path of travel, as represented in at least FIGS. 2-5. Also, the penetration patterns may vary from one another dependent at least in part on the relative location, orientation, etc. of the cutting edges 31 and the different blade segments of the different cutting blades, as will be even more apparent from the following description of the additional preferred embodiment of at least FIGS. 14-16.

Accordingly, additional preferred embodiments of the tenderizing assembly are represented as 10' in FIGS. 14-19. As such, tenderizing assembly 10' includes operational similarities but also structural modifications which at least partially distinguish the various embodiments of the tenderizing assembly 10 and 10' from one another. Therefore, the tenderizing assembly 10' includes at least one, but preferably a plurality of processing sections 12, which may be located on a common side of the path of travel 100 and/or on opposite sides thereof, as represented in FIG. 14. Also, as set forth above each of the processing sections 12 may include at least two cutting rollers 14 and 16. Moreover, the processing sections 12 and the at least two cutting rollers 14 and 16 associated therewith may be relatively and cooperatively disposed, positioned and oriented in the various formats set forth in detail above, with reference to the embodiments of FIGS. 1-13.

Figure 15:
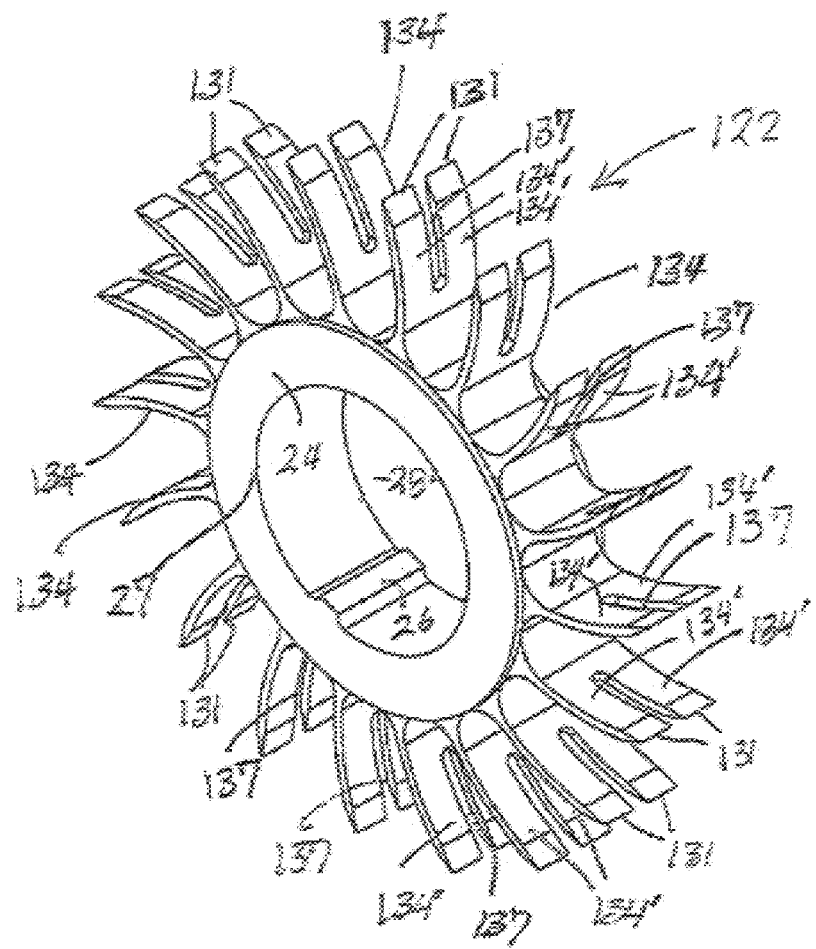
FIG. 15 is a perspective view of another preferred embodiment of a cutting blade associated with at least one cutting roller of one or more of the processing sections of the tenderizing assembly of the embodiment of FIG. 14.
Figure 16:
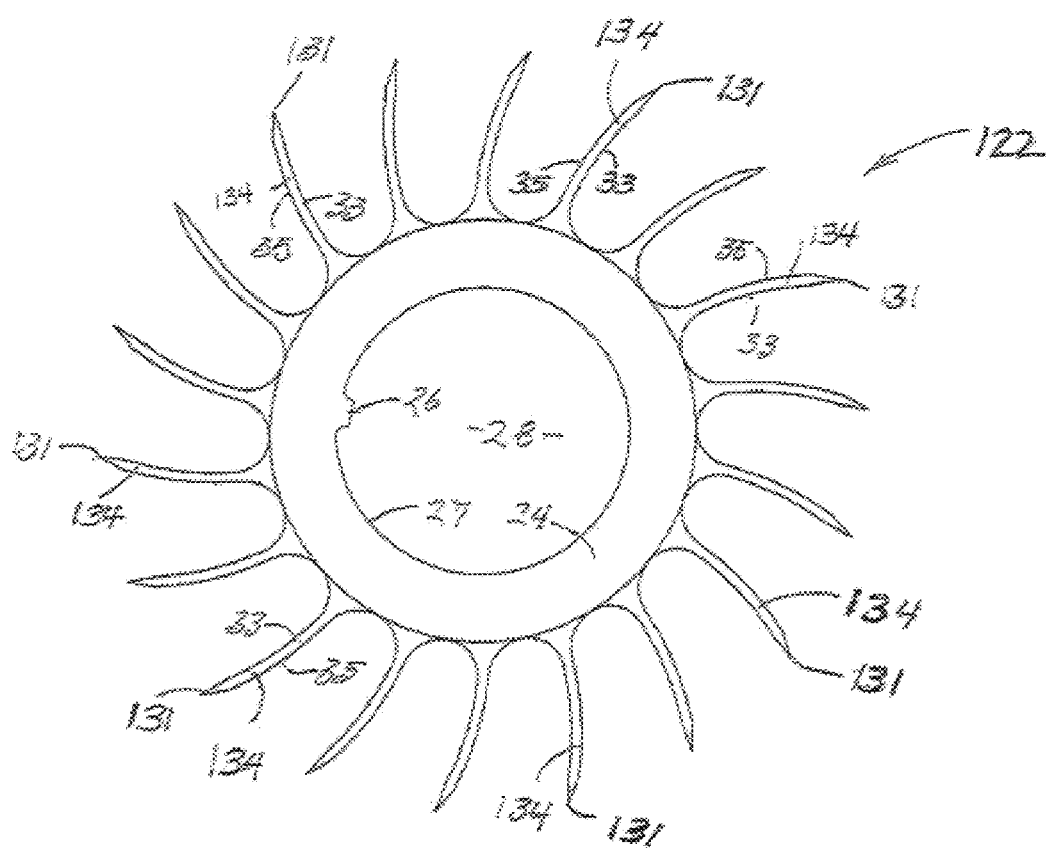
FIG. 16 is a side view of the embodiment of the cutting blade, as represented in FIG. 15.
Figure 16A:
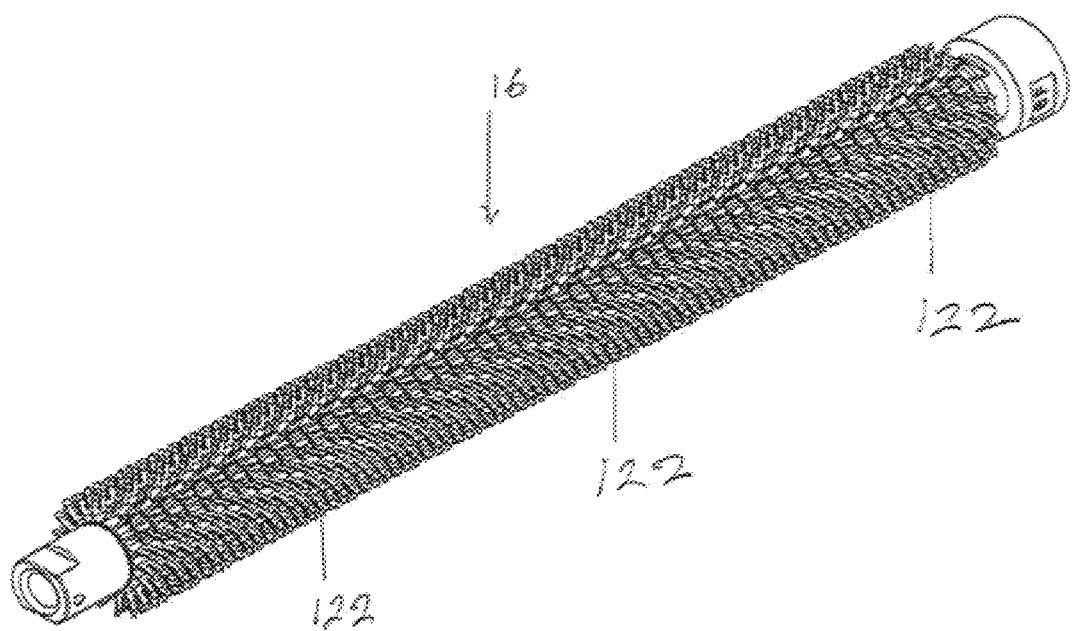
FIG. 16A is a perspective view of one embodiment of a cutting roller including cutting blades, as represented in the embodiment of FIGS. 15 and 16, operatively mounted thereon.
Figure 16B:
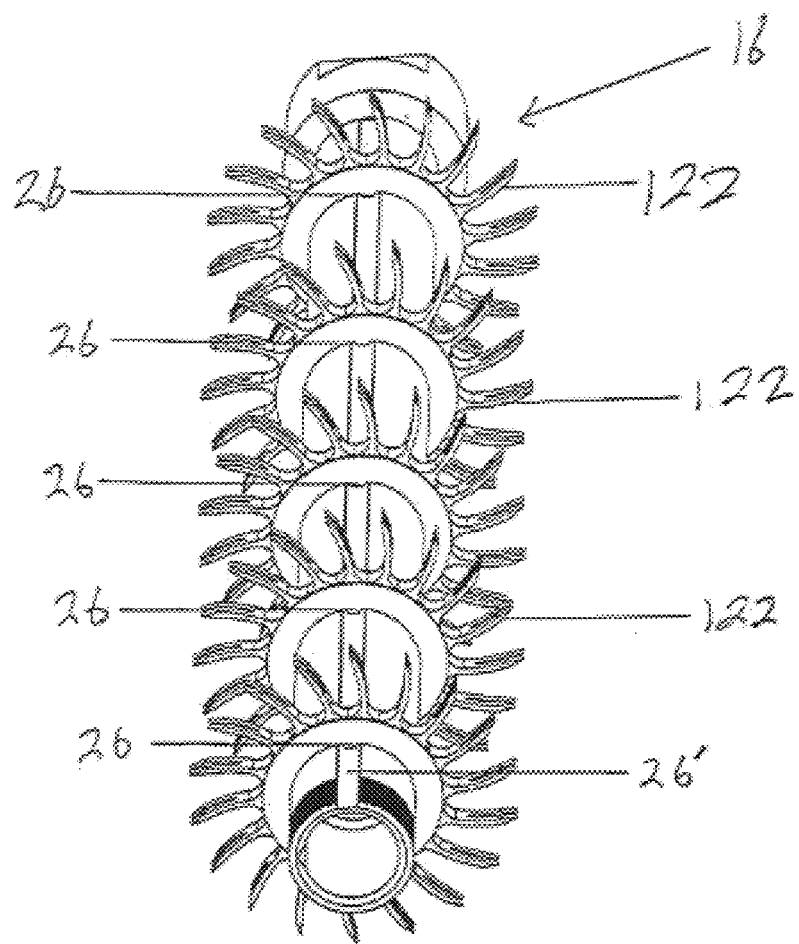
FIG. 16B is a perspective view in exploded form of the assembling of the cutting blades of the embodiment of FIGS. 15 and 16, on a cutting roller as represented in the embodiment of FIG. 16A.

However, at least one structural difference comprises a modification of the cutting blades, represented in FIGS. 15 and 16A-16B as 122. More specifically, each of the plurality of cutting blades 122 includes a base 24, central opening or aperture 28 and connecting key element 26, all of which facilitates the mounting of the plurality of cutting blades 122 in adjacent relation to one another along the length of the cutting roller 16, so as to rotate therewith, as described with the one or more embodiments represented in FIGS. 1-13. However, each, a majority or at least a predetermined number of the cutting blades 122 include a plurality of curved blade segments 134 having oppositely disposed concave and convex faces surfaces 33 and 35 respectively. Further, the plurality of curved blade segments 134 also include a "bifurcated" construction comprising at least two blade sections 134', 134' separated by at least one elongated channel 137. It is emphasized that the number of blade sections 134' may be greater than two. In such a contemplated structural variation, adjacent ones of the plurality of blades sections 134', regardless of their number, May be separated by different elongated channels 137. By way of example only, a cutting blade 122 having a plurality of three blade sections 134' could include two elongated channels 137, each of which are disposed between different, next adjacent blade sections 134'. Further the curvature of the blades 134 serves to better transfer the meat without clogging, and releases the meat in a manner that does not compromise or distort the meat, giving it a more consistent texture and orientation as it releases.

As also represented in FIGS. 15 and 16, the cutting edges 131 of each of the blade segments 134 and blade sections 134' have a sharpened configuration. This may be at least partially different from the cutting edges 31 represented as part of the cutting blades 20, 20' and 30, 30' of the embodiments of FIGS. 1-13. As represented therein, the cutting edges 31, as with any edge in the system, may have a more "blunted", rather than the "sharpened" configuration of the cutting edges 131. Further, the "bifurcated" construction of the blade segments 134, represented by at least two spaced apart blade sections 134', are disposed in interactive relation to adjacent, correspondingly disposed cutting blades 20 or 20' associated with the cutting roller 14. As a result, the cutting pattern formed in at least one or preferably opposite sides or surfaces of the food or meat passing along the path of travel 100 will vary from the cutting pattern 200 represented in FIG. 13.

In addition, the bifurcated construction of the plurality of blade segments 134 of blades 122 provide a somewhat different "interaction" with the cutting blades 20 or 20' of a next adjacent, correspondingly positioned cutting roller 14. As such, the spacing 23 between adjacent blade segments 30 and/or the spacing 25 between the blade segments 32, as represented in FIG. 6 and specifically referred to above, may vary. More specifically, the bifurcated construction of the blade segments 132, including the elongated slots 137, will result in an orientation or disposition of each of the cutting blades 122, relative to the correspondingly disposed, next adjacent cutting blades 20 and/or 20' such that at least some of the blade segments 30 will be received and pass through aligned, correspondingly positioned ones of the plurality of slots 137. This will result in a stripping action or cleaning action serving to remove any inadvertently retained food or meat on either the blade segments 30 and/or the blade segments 134, as the slots 137 receive and facilitate passage there through of the aligned blade segments 30 and/or 30'. It is also to be noted that the spacing between the blades 20 and/or 20' and the cutting blades 122 on next adjacent, correspondingly positioned, interactive cutting rollers 14 and 16 may also result in at least some of the blade segments 30 passing between the bifurcated blade segments 134 of different, adjacent, spaced apart blades 122, on a common cutting roller 16.

As represented in FIGS. 16A and 16B the mounting of the cutting blades 122 on a cutting roller 16 may be structurally and or operationally equivalent to that represented in FIG. 9C. More specifically, mounting or operative attachment of the blades 122 include the alignment of the key members 26 on each of the cutting blades 122 with the keyway or channel 26'. Each of the blades 122 are then disposed in adjacent but at least minimally, predetermined spaced relation to one another resulting in a substantially horizontally oriented stacked array as represented in FIG. 16 A. It is of course noted that the cutting blades 122 are the type represented in greater detail and FIGS. 15 and 16.

Yet another structural feature represented in the embodiment of FIGS. 14 and 17-19 is the inclusion of a stripper assembly generally indicated as 250. As such, the stripper assembly 250 includes at least one stripper member 252 and the possibility of a second stripper member 254 each disposed on opposite sides (lower and upper respectively) of the path of travel 100, as represented in FIG. 14. The at least one stripper member 252 is represented in greater detail in FIG. 17 and includes a first stripper segment 255 disposed in substantially aligned relation with the path of travel 100. In addition, the at least one lower stripper member 252 includes a second stripper segment 257 disposed in substantially transverse relation to the length of the path of travel 100 and also in transverse relation to the first stripper segment 255. Structural modifications representing yet another embodiment of the stripper assembly 250 may also include a stripper extension 255' which is fixedly, integrally or removably connected to an outer end 256 of the first stripper segment 255.

Figure 17:
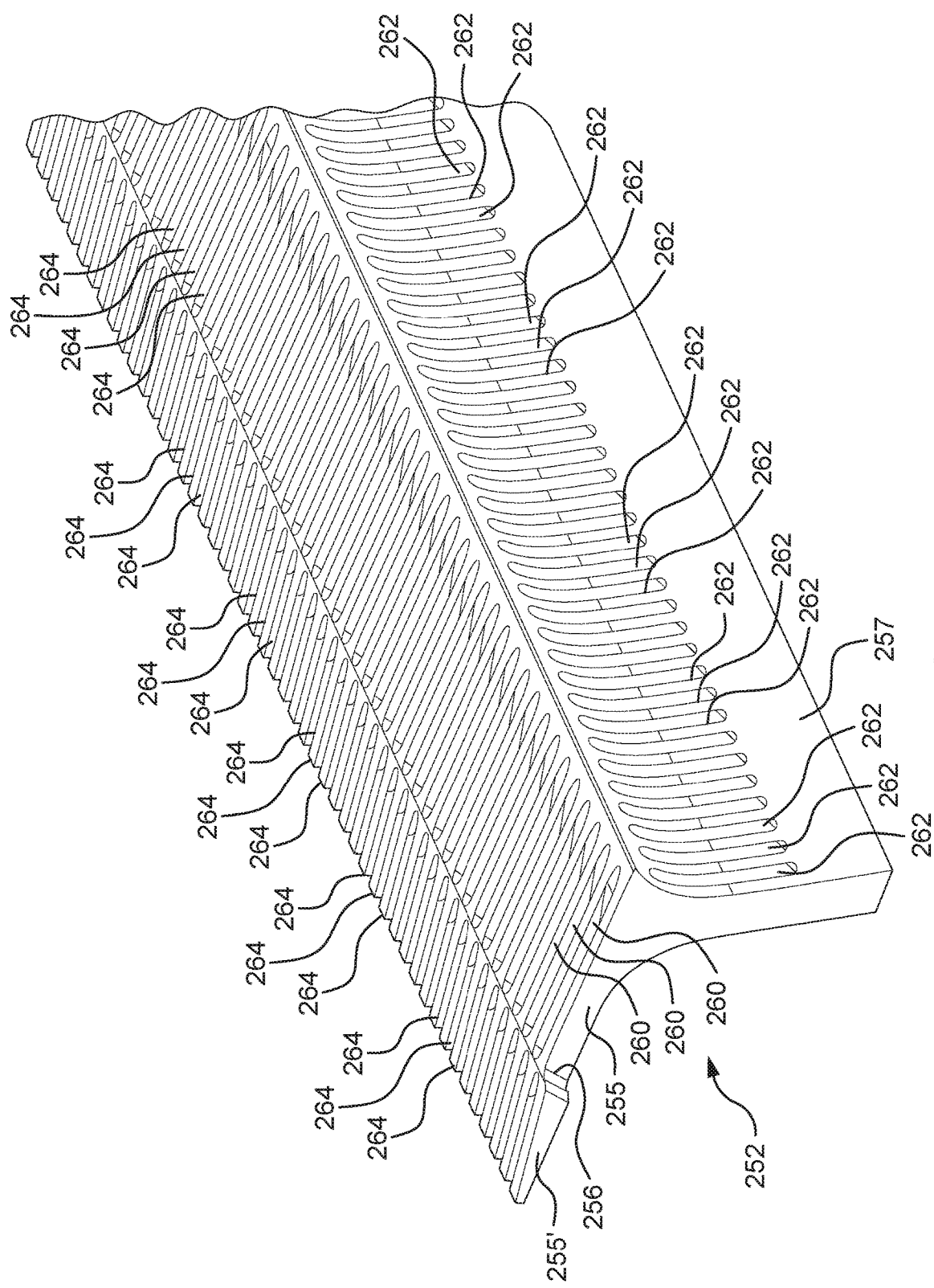
FIG. 17 is a perspective view in partial cutaway of a stripping member associated with the stripping assembly as represented in at least FIG. 14.

Additional structural and operative features of the stripper assembly 250 and in particular the one lower stripper segment 252 include a slotted construction. More specifically, the slotted construction may comprise a first plurality of elongated slots 260 formed in the first stripper segment 255. The slotted construction may also comprise a second plurality of slots 262 formed in spaced relation to one another in the second stripper segment 257. When the stripper extension to 55' is utilized, as represented in FIG. 17, the aforementioned slotted construction also comprises a third plurality of adjacently spaced apart open-ended slots 264. As indicated, each of the first, second and third plurality of slots 260, 262 and 264 are structured to have the respective slots disposed in adjacent, predetermined spaced relation to one another. As such, each slot of each of the first, second and third plurality of slots 260, 262 and 264 is disposed to receive a blade segment of a next adjacent, correspondingly positioned roller.

Figure 18:
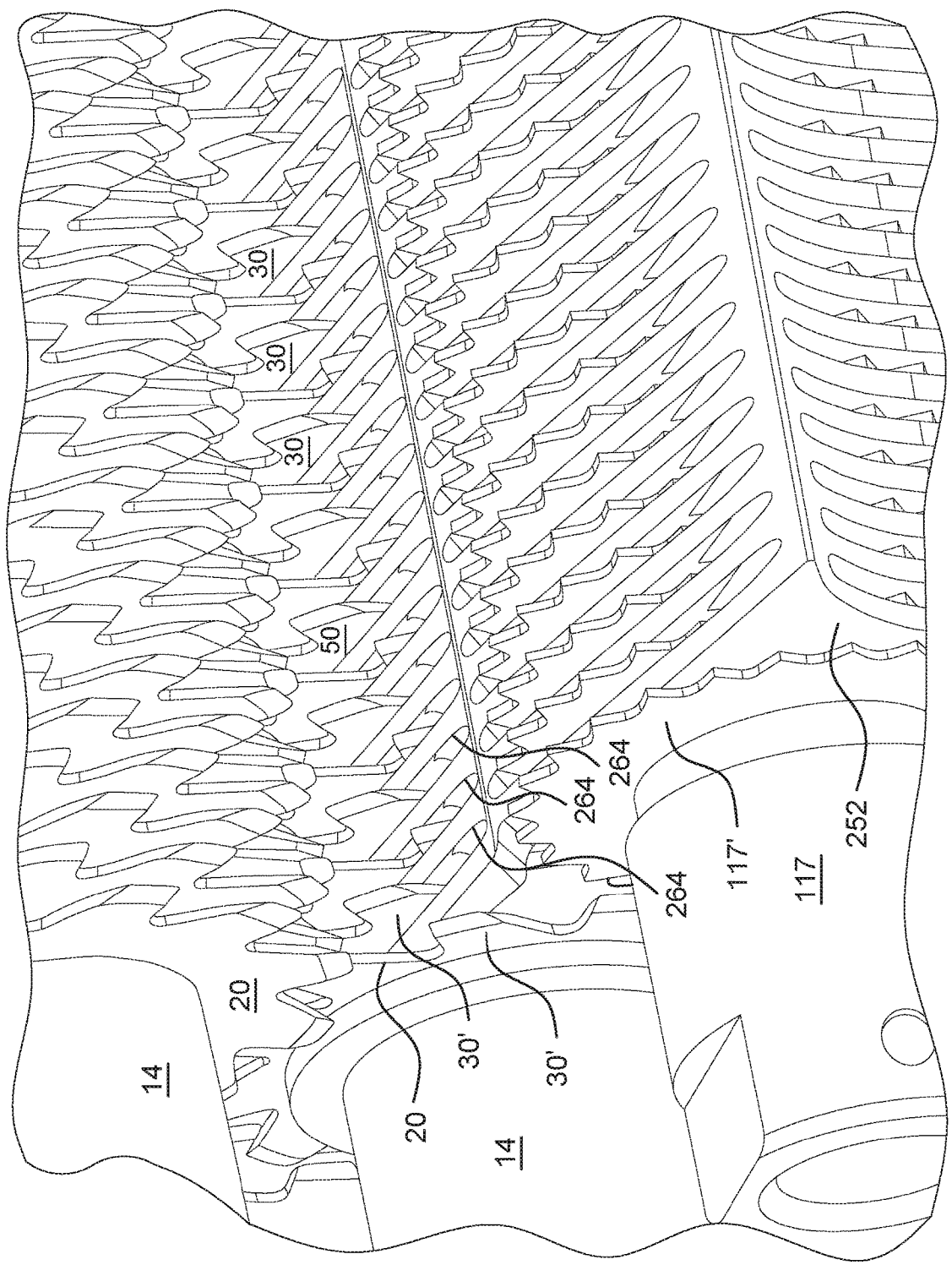
FIG. 18 is a perspective view in partial cutaway of the stripping member of the embodiment of FIG. 17 in use and in interaction with one or more rollers of the tenderizing assembly of at least the embodiment of FIG. 14.
Figure 19:
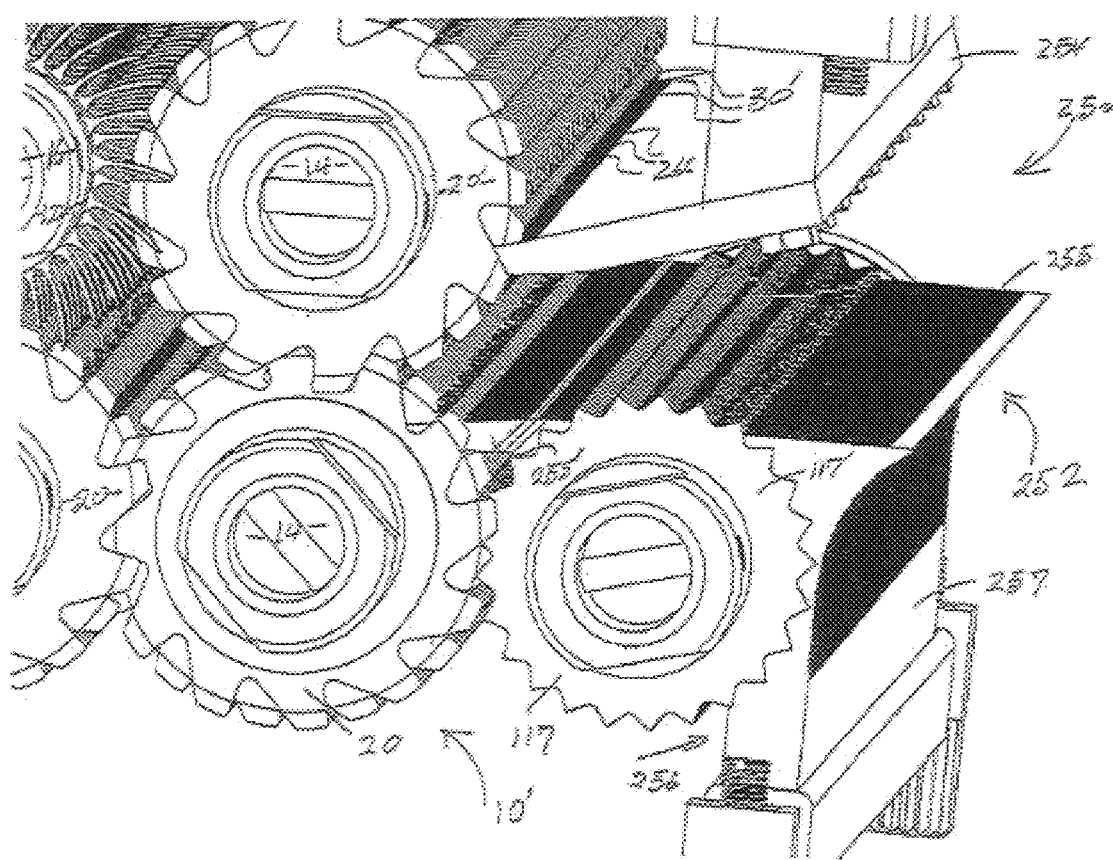
FIG. 19 is a perspective view in partial cutaway of the stripper assembly, including at least two stripper members, Figure as at least partially represented in the embodiment of FIGS. 14, 17 and 18.

More specifically, as represented in FIGS. 18 and 19, a drive roller or flattening rollers 117 is disposed in corresponding relation and immediately adjacent to the lower, stripper member 252. Accordingly, the various "blade segments" 117' are cooperatively disposed and aligned with the first plurality of slots 260 so as to pass there through. It is also of note that the first and second plurality of slots 260 and 262 in the first and second stripper segments 255 and 257 are aligned with one another. As a result, a common blade segment 117' associated with the next adjacent and correspondingly positioned roller 117 passes through aligned ones of the slots 260 and 262, again as represented in FIGS. 18 and 19.

With additional reference to FIGS. 18 and 19, when the stripper extension 255' is utilized the third plurality of slots 264 are disposed in predetermined spaced relation to one another such that different ones of the blade segments, such as at 30', of cutting roller 14, pass through correspondingly disposed, aligned ones of the third plurality of slots 264. Due to the position of the stripper section 255' and the corresponding third plurality of slots 264, the outer ends of the slots 264 are open, facilitating receipt and passage of the blade segments 30' there through.

As represented in FIG. 19, and as set forth above, the stripper assembly 250 may also include the upper stripper segment 254. When provided the stripper segment 254 may also include a fourth plurality of slots 266 formed in at least an outer periphery thereof. The fourth plurality of slots 266 are disposed in predetermined spaced relation so as to receive and facilitate passage there through of correspondingly disposed blade segments 30' of the plurality of cutting blades 20' on the cutting roller 14.

Since many modifications, variations and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An assembly structured to tenderize food comprising:
   at least one processing section disposed along a path of travel of the food being tenderized,
   said one processing section including at least two elongated, rotatable cutting rollers extending transverse to a length of said path of travel,
   each of said two cutting rollers comprising a plurality of blades rotatable therewith and collectively extending along at least a portion of the length of thereof in spaced relation to one another,
   each of said plurality of blades comprising a plurality of elongated blade segments; each of said plurality of blade segments including at least one cutting edge disposed on an outer free end thereof and disposable in penetrating relation to the food passing along the length of said path of travel,
   said plurality of cutting edges on each of said two cutting rollers cooperatively oriented to perform at least a bi-directional cut, during a single pass of the food along said path of travel, and
   said plurality of cutting edges on a first of said two cutting rollers disposed in substantially transverse relation to said plurality of cutting edges on a second of said two cutting rollers.

2. The assembly as recited in claim 1 wherein said plurality of cutting edges on said first cutting roller are oriented in substantially longitudinally aligned relation with the length of said path of travel.

3. The assembly as recited in claim 2 wherein said plurality of cutting edges on said second cutting roller are oriented in substantially transverse relation to the length of said path of travel.

4. The assembly as recited in claim 1 wherein said plurality of cutting edges on each of said first and second cutting rollers are collectively disposed to at least partially define a predetermined penetration pattern in the food passing along the length of said path of travel.

5. The assembly as recited in claim 4 wherein said predetermined penetration pattern is at least partially defined by said plurality of cutting edges on adjacent ones of said plurality of blades of each of said first and second cutting rollers being longitudinally off-set from one another along the length of a corresponding one of said cutting rollers.

6. The assembly as recited in claim 1 wherein said first and second cutting rollers are disposed in adjacent relation to one another along at least a portion of their respective lengths.

7. The assembly as recited in claim 6 wherein said first and second cutting rollers are further disposed on a common side of said path of travel.

8. The assembly as recited in claim 7 wherein said plurality of blades of each of said first and second cutting rollers are disposed in intermeshing relation with one another, upon concurrent rotation of said first and second cutting rollers.

9. The assembly as recited in claim 1 wherein said first and second cutting rollers are rotationally disposed on a common side of said path of travel in a substantially intermeshing alignment with one another.

10. The assembly as recited in claim 9 wherein said intermeshing alignment comprises said plurality of blades of each of said first and second cutting rollers being disposed between said plurality of blades of the other of said first and second cutting rollers, at least during concurrent rotation thereof.

11. The assembly as recited in claim 10 wherein said plurality of blades on each of said two cutting rollers are disposed between said plurality of blades of the other of said two cutting rollers.

12. The assembly as recited in claim 10 wherein said intermeshing alignment comprises said blades of at least one of said two cutting rollers being disposed in stripping relation between said plurality of blades of the other of said two cutting rollers, during concurrent rotation of said two cutting rollers.

13. The assembly as recited in claim 1 wherein said blades of at least one of said two cutting rollers are disposed in stripping relation between said plurality of blades of the other of said two cutting rollers during concurrent rotation of said two cutting rollers.

14. The assembly as recited in claim 13 wherein said plurality of cutting edges on said first cutting roller are oriented in substantially longitudinally aligned relation with the length of said path of travel.

15. The assembly as recited in claim 14 wherein said plurality of cutting edges on said second cutting roller are oriented in substantially transverse relation to a length of said cutting edges on said first cutting roller.

16. The assembly as recited in claim 1 further comprising at least two processing sections each including a first cutting roller and a second cutting roller.

17. The assembly as recited in claim 16 wherein each of said at least two processing sections is disposed on a common side of said path of travel in substantially parallel relation to one another and in transverse relation to the length of said path of travel.

18. The assembly as recited in claim 16 wherein said at least two processing sections are disposed on opposite sides of said path of travel in substantially parallel relation to one another and in transverse relation to the length of said path of travel.

19. The assembly as recited in claim 18 wherein said first and second cutting rollers of one of said at least two processing sections are respectively disposed in longitudinal alignment said first and second cutting rollers of the other of said at least two processing sections.

20. The assembly as recited in claim 18 wherein said first and second cutting rollers of each of said at least two processing section are respectively disposed in longitudinal alignment with said second and first cutting rollers of the other of said two processing sections.

21. The assembly as recited in claim 1 wherein said plurality of blade segments of said plurality of blades on at least one of said two cutting rollers include a curved configuration extending along at least a majority of the length thereof.

22. The assembly as recited in claim 21 wherein said curved configuration of said plurality of blade segments comprises a substantially concave face and an oppositely disposed convex face.

23. The assembly as recited in claim 21 wherein said each of curved blade segments comprise a bifurcated configuration including two blade sections separated by an elongated channel.

24. The assembly as recited in claim 23 wherein each of said elongated channels are disposed and dimensioned to receive passage therethrough of a correspondingly disposed blade segment of the other of said two cutting rollers.

25. The assembly as recited in claim 1 further comprising a stripper assembly including at least one stripper member; said at least one stripper member including a slotted construction structured to interact with and remove food from an adjacent, correspondingly disposed roller of said path of travel.

26. The assembly as recited in claim 25 wherein said slotted construction comprises a first plurality of slots formed in a first stripper segment, said first stripper segment longitudinally aligned with said path of travel.

27. The assembly as recited in claim 26 wherein said first plurality of slots are disposed and dimensioned to receive passage therethrough of roller segments of said adjacent, correspondingly disposed roller.

28. The assembly as recited in claim 26 wherein said slotted construction further comprises a second plurality of slots formed in a second stripper segment; said second stripper segment transversely disposed to said first stripper segment and to the length of said path of travel.

29. The assembly as recited in claim 28 wherein said first and second plurality of slots are dimensioned and disposed to receive passage of said plurality of roller segments of said adjacent, correspondingly disposed roller there through.

30. The assembly as recited in claim 29 wherein said first plurality of slots is aligned with a said second plurality of slots; aligned ones of said first and second plurality of slots disposed to concurrently receive passage there through of a common one of said plurality of roller segments of said adjacent, correspondingly disposed roller.

31. The assembly as recited in claim 28 further comprising an extension segment disposed on and extending outwardly from said first stripper segment; said slotted construction further comprising a third plurality of slots formed in said extension segment; said third plurality of slots disposed and structured to receive passage there through of said plurality of blade segments of a next adjacent one of said two cutting rollers.

32. An assembly for tenderizing a food product comprising:
- a plurality of processing sections each including elongated first and second cutting rollers disposed in cooperative, interactive relation to one another and in transverse relation to a length of a path of travel of the food product being tenderized,
- each of said first and second cutting rollers comprising a plurality of cutting blades rotatable therewith and collectively extending along the length thereof in spaced relation to one another,
- each of said plurality of cutting blades comprising a plurality of blade segments; each of said blade segments including at least one cutting edge disposable in penetrating relation to the food product passing along the length of said path of travel,
- said plurality of said cutting edges on said first cutting roller disposed in substantially transverse relation to said plurality of cutting edges on said second cutting roller,
- a stripper assembly including at least one stripper member including a first stripper segment and a second stripper segment respectively oriented in substantially aligned and transverse relation to the length of said path of travel; and
- each of said first and second stripper segments including a slotted construction structured to interact with and remove food from at least one adjacent, correspondingly disposed roller of said path of travel.

\* \* \* \* \*